（12）United States Patent
Schuler et al.

(10) Patent No.: US 10,788,975 B2
(45) Date of Patent: *Sep. 29, 2020

(54) SYSTEMS AND METHODS FOR PROVIDING INTEGRATED USER INTERFACE ELEMENTS FOR NAVIGATION

(71) Applicant: The Gap, Inc., Albuquerque, NM (US)

(72) Inventors: Gregory Michael Schuler, San Francisco, CA (US); David William Barrowman, Oakland, CA (US)

(73) Assignee: The Gap, Inc., San Francisco, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/674,829

(22) Filed: Aug. 11, 2017

(65) Prior Publication Data

US 2018/0046365 A1    Feb. 15, 2018

Related U.S. Application Data

(60) Provisional application No. 62/543,546, filed on Aug. 10, 2017, provisional application No. 62/373,785, filed on Aug. 11, 2016.

(51) Int. Cl.
*G06F 17/00* (2019.01)
*G06F 3/0485* (2013.01)
(Continued)

(52) U.S. Cl.
CPC ........ *G06F 3/04855* (2013.01); *G06F 3/0482* (2013.01); *G06F 3/04847* (2013.01); *G06F 3/04883* (2013.01); *G06Q 30/0643* (2013.01)

(58) Field of Classification Search
CPC ............... G06F 3/0482; G06F 3/04847; G06F 3/04855; G06F 3/04883; G06F 3/0488; G06Q 30/0643
See application file for complete search history.

(56) References Cited

U.S. PATENT DOCUMENTS 9,411,422 B1 * 8/2016 McClendon ............ G06F 3/016
2007/0112850 A1 * 5/2007 Flynn ...................... H01L 27/30
(Continued)

OTHER PUBLICATIONS

JSON From Wikipedia, retrieved from https://en.wikipedia.org/wiki/JSON, archived Jul. 22, 2016, 13 pages.*

*Primary Examiner* — Scott T Baderman
*Assistant Examiner* — Barbara M Level
(74) *Attorney, Agent, or Firm* — Morgan, Lewis & Bockius LLP

(57) ABSTRACT

A computing system comprising a touch-sensitive surface, a processor, and memory is provided. The memory stores instructions for executing a method in which a plurality of images is accessed. The images are indexed in a data structure specifying a bi-directional order by which the images are to be accessed. A first image from the images is included in a module on the surface based upon the order. A navigation wheel and a bar UI element are included in the module. The bar UI element presents a current location indicator indicating a location of the first image within the structure. A directional input for the navigation wheel in a first direction is received, and, in response, the first image is replaced with a second image in the module from among the plurality of images based upon the order and the bar UI element is updated to indicate the second image location.

27 Claims, 22 Drawing Sheets

(51) Int. Cl.
*G06F 3/0488* (2013.01)
*G06F 3/0482* (2013.01)
*G06F 3/0484* (2013.01)
G06Q 30/06 (2012.01)

(56) References Cited

U.S. PATENT DOCUMENTS

| | | | | |
|---|---|---|---|---|
| 2007/0143705 | A1* | 6/2007 | Peters | G06F 3/04855 |
| | | | | 715/786 |
| 2007/0236475 | A1* | 10/2007 | Wherry | G06F 3/0485 |
| | | | | 345/173 |
| 2012/0191577 | A1* | 7/2012 | Gonsalves | G06Q 30/06 |
| | | | | 705/27.2 |
| 2012/0297302 | A1* | 11/2012 | Barraclough | G06F 3/0485 |
| | | | | 715/716 |
| 2012/0311438 | A1* | 12/2012 | Cranfill | G06Q 20/123 |
| | | | | 715/256 |
| 2013/0185642 | A1* | 7/2013 | Gammons | G06F 3/0482 |
| | | | | 715/733 |
| 2013/0260869 | A1* | 10/2013 | Basallo | G07F 17/3267 |
| | | | | 463/25 |
| 2013/0332856 | A1* | 12/2013 | Sanders | G06F 3/0481 |
| | | | | 715/753 |
| 2015/0026575 | A1* | 1/2015 | Martin | G06F 3/04842 |
| | | | | 715/720 |
| 2015/0212664 | A1* | 7/2015 | Freer | G06F 3/0482 |
| | | | | 705/14.54 |

* cited by examiner

SYSTEMS AND METHODS FOR PROVIDING INTEGRATED USER INTERFACE ELEMENTS FOR NAVIGATION

CROSS REFERENCE TO RELATED APPLICATIONS

This application claims priority to U.S. Provisional Application Nos. 62/373,785, entitled USER INTERFACE WITH INTEGRATED USER INTERFACE ELEMENTS, filed Aug. 11, 2016, and 62/543,546, entitled USER INTERFACE WITH INTEGRATED USER INTERFACE ELEMENTS, filed Aug. 10, 2017, each of which is hereby incorporated by reference herein in its entirety.

FIELD

The disclosed implementations relate generally to improved systems and methods for graphical user interfaces.

BACKGROUND

Graphical user interfaces are widely used. A number of techniques are used to navigate through collections of images or other records. Some techniques involve stepping through a collection one image at a time, or selecting a record from a dropdown menu, or selecting a record from a thumbnail. These techniques are limited in the total collection size that can be conveniently navigated. Some other folder-based techniques do not provide perspective of an overall collection from within a sub-folder, and can be cumbersome to navigate. Further techniques require a large amount of screen area. Accordingly, there remains a need for improved graphical user interfaces for navigating through collections of items.

SUMMARY

In summary, the detailed description is directed to various innovative technologies for graphical user interfaces (GUI) suitable for navigating through a collection of objects. Examples of disclosed technologies use a combination of a wheel user interface (UI) element and a bar UI element to receive continuous variable input from a user for sequential traversal of an object collection, to indicate a current position within one of multiple sections of the object collection, and to receive discrete user input to jump to a selection section of the object collection.

One aspect of the present disclosure provides a computing system comprising a touch-sensitive surface, one or more processors, and a memory. The memory stores instructions for executing a method comprising accessing an image collection comprising a plurality of images indexed as an ordered data structure that specifies a bi-directional order by which images in the plurality of images are to be accessed. The ordered data structure comprises a plurality of contiguous subsets of images. Each respective contiguous subset of images in the plurality of contiguous subsets of images represents a different label in a plurality of labels. A first image from the image collection is include in a module on the touch-sensitive surface based upon the bi-directional order. A navigation wheel is included in the module. A bar UI element is included in the module. The bar UI element includes a plurality of indicia indicative of respective labels in the plurality of labels. Spacing between the indicia indicates a number of images in the plurality of images in each subset. The bar UI element presents a current location indicator that indicates a location of the first image within the ordered data structure. A directional user input for the navigation wheel in a first direction is received, and, responsive to this, the first image is replaced with a second image from among the plurality of images based upon a first direction in the bi-directional order. The bar UI element is also updated to indicate a location of the second image. A second user input is received to toggle the bar UI element between (i) a first mode in which the respective label for each subset in the plurality of subsets is included alongside the indicia in the plurality of indicia corresponding to the respective subset thereby including the plurality of labels in the module, and (ii) a second mode in which the label of the current subset of the image collection is included and no other label in the plurality of labels is included.

According to another aspect of the present disclosure, a UI is disclosed for displaying images of an image collection, and includes interrelated navigation wheel and bar UI elements. Segments of the bar represent respective sections of the image collection. The bar provides the location of a currently displayed image within its section. Scrolling of the navigation wheel in the forward or backward direction replaces the currently displayed image with another image, and changes the displayed location on the bar.

According to another aspect of the present disclosure, methods for operating a UI are disclosed. A first method provides for moving through image content on a UI. A first user input is received for a navigation wheel UI element, which causes a currently displayed image from the content to be replaced by another image from the content. A bar UI element is displayed, with a plurality of indicia indicative of categories of the image content. The spacing between successive indicia indicate an amount of content in each category. The bar UI element also indicates a location of the currently displayed image within its category. The bar UI element and the navigation wheel UI element are interrelated such that scrolling the navigation wheel UI element changes the location indication in the bar UI element.

In a second method, one or more variable items of a catalog are rendered on a display. A wheel UI element is rendered on the display, and the catalog is traversed responsive to user inputs for a wheel UI element. A bar UI element is rendered on the display, the bar having divisions representing respective sections of the catalog. On or alongside the bar, positions of the rendered variable item(s) within their catalog section(s) are indicated.

A third method is disclosed, for navigating through a UI, which includes displaying a bar UI element in a position indicating mode and receiving a user input to transform the bar to a navigation mode. In position indicating mode, the bar includes multiple indicia indicative of image categories, wherein spacing between indicia indicates an amount of content in each category. The bar UI element also indicates a location of a currently displayed image within its category. In navigation mode, each of the indicia includes or is accompanied by a heading representing the associated category. The headings are selectable to navigate to the respective categories.

A fourth method is disclosed, including rendering, on a display, a succession of pictures of a catalog, and traversing the catalog responsive to user inputs for a wheel UI element. This method further includes rendering, on the display, a bar UI element in a position indicating mode, having indicia demarcating sections of the catalog, wherein spacing between indicia is dependent on sizes of the sections; indicating, on the bar UI element, representative positions of the rendered pictures within a section of the catalog; and transforming the bar UI element, responsive to a user input for the bar UI element, into a navigation mode wherein evenly spaced selectable labels are displayed in association with respective indicia. Selection of a label transforms the bar UI element into position indicating mode, and renders a picture from a catalog section associated with the selected label.

In a third aspect, computer-readable media storing instructions for implementing a GUI architecture are disclosed. The GUI architecture includes an image manager, a navigation module, a bar UI element, a bar manager module, a wheel UI element, a wheel manager module, an image display buffer for an image tableau, a bar display buffer for the bar UI element, and a wheel display buffer for the wheel UI element. The image manager is coupled between an image library organized in multiple sections, and the image display buffer. The navigation module includes a current position storage location associated with the image library, and is coupled between an event handler and the image manager. The image manager is operable to populate the image buffer with an image at the current position in the image library, which causes the image to be rendered within the image tableau on a display. Events routed to the navigation module are operable to update the current position. The bar UI element is rendered from the bar display buffer with demarcations representing the plurality of library sections. The bar UI element has a position-indicating mode in which the current position is displayed within a current section, and a navigation-input mode in which labels of the sections are displayed. The bar module is coupled between the event handler and the bar display buffer; events routed to the bar module when the bar UI element is in position-indicating mode are operable to transform the bar UI element to the navigation-input mode. Events routed to the bar module when the bar UI element is in navigation-input mode correspond to selection of a section and are operable to transform the bar UI element to the position-indicating mode and to set the current position variable to within the selected section.

In a fourth aspect, a method is disclosed for rendering section markers for a bar UI element. The length of the bar P in pixels is obtained. The sections are indexed by variable i, and the amount A(i) of content is determined for each section. The pixel length B(i) of each section is determined, proportional to A(i). The pixel coordinate of the first section marker C(1) is set to the start pixel P0 of the bar. The pixel coordinate of successive markers are calculated as C(i+1)= C(i)+B(i). The section markers are rendered at the calculated positions C(i). An optional end marker is rendered at coordinate P0+P−1. Variations are disclosed.

In a fifth aspect, a method is disclosed for launching a GUI according to disclosed technologies. Beginning on a launching webpage rendered within a browser, an input is received for a catalog selection. A corresponding request is sent to a catalog API server. Upon receipt of the request, the catalog API server returns the GUI webpage, which can include active scripts for user interaction, to the requester. The catalog API server also transmits the catalog structure, which can be in JSON format, to the requester. Upon receipt of these items, the requesting browser executes instructions on a processor to build and launch the GUI. The catalog API server also transmits the catalog items themselves, which can be images. Depending on catalog size and available bandwidth, download of catalog items can take a long time. Thus, the catalog download can extend over periods before, during, and/or after the GUI launch.

Another aspect of the present disclosure provides a user interface for viewing images of an image collection on an electronic device with a touch-sensitive surface. The image collection comprises a plurality of images indexed as an ordered list that specifies a bi-directional linear order by which images in the plurality of images are to be displayed. The ordered list comprises a plurality of contiguous subsets of images. Each respective contiguous subset of images in the plurality of contiguous subsets of images represents a different category in a plurality of categories. Each category in the plurality of categories is associated with a corresponding label in a plurality of labels. The user interface comprises a bar User Interface (UI) element rendered on the touch-sensitive surface. The bar UI element is divided into segments representing respective categories of the plurality of categories. The bar UI element includes a current location indicator that indicates a current location within the ordered list. The user interface further comprises a navigation wheel UI element rendered on the touch-sensitive surface such that (i) scrolling of the navigation wheel UI element in a first direction changes a currently displayed image of the image collection in accordance with a first direction in the bi-directional linear order and concurrently changes the current location indicator on the bar UI element so as to integrate movement of the navigation wheel UI element and the bar UI element and (ii) scrolling of the navigation wheel UI element in second direction opposite the first direction changes a currently displayed image of the image collection in accordance with a second direction in the bi-directional linear order and concurrently changes the current location indicator on the bar UI element so as to integrate movement of the navigation wheel UI element and the bar UI element. The bar UI element is configured to switch between (i) a display mode where the label for each category in the plurality of categories is displayed thereby displaying the plurality of labels and where selection of a displayed label in the plurality of labels causes the current location indicator to jump to a position in the bi-directional linear order that represents the corresponding category of the plurality of categories and to display an image in the plurality of images that is in the corresponding category, and (ii) a standard mode where the label of the current category of the image collection is displayed and no other label in the plurality of labels is displayed.

Another aspect of the present disclosure provides a method performed at an electronic device with a touch-sensitive surface executing one or more applications. The method comprises rendering a navigation wheel within a first application in the one or more applications. The first application electronically accesses an image collection comprising a plurality of images indexed as an ordered list that specifies a bi-directional linear order by which images in the plurality of images are to be displayed. The ordered list comprises a plurality of contiguous subsets of images. Each respective contiguous subset of images in the plurality of contiguous subsets of images represents a different category in a plurality of categories. Each category in the plurality of categories is associated with a corresponding label in a plurality of labels. The first application displays a currently displayed image from the image collection on the touch-sensitive surface in accordance with the bi-directional linear order. In the method, a bar UI element is rendered within the first application. The bar UI element includes a plurality of indicia indicative of respective categories in the plurality of categories. Spacing between the indicia indicates a number of images in the plurality of images in each category. The bar UI element displays a current location indicator that indicates a location of the currently displayed image within the ordered list. In the method, a directional user input for the navigation wheel in a first direction is received. Responsive to the directional user input in the first direction, the currently displayed image is replaced with a replacement image from among the plurality of images in accordance with a first direction in the bi-directional linear order. Further, the bar UI element is updated to indicate a location of the replacement image. In the method, a second user input is received to toggle the bar UI element between (i) a navigation mode where the respective label for each category in the plurality of categories is displayed alongside the indicia in the plurality of indicia corresponding to the respective category thereby displaying the plurality of labels, and (ii) a standard mode where the label of the current category of the image collection is displayed and no other label in the plurality of labels is displayed.

Another aspect of the present disclosure provides a method comprising: rendering, on a display, a wheel User Interface (UI) element and a bar UI element. In the method there is successively rendered, on the display, respective pictures of a plurality of pictures, where the plurality of pictures are indexed as an ordered list that specifies a bi-directional linear order by which pictures in the plurality of pictures are to be displayed, and wherein the ordered list comprises a plurality of contiguous subsets of pictures, wherein each respective contiguous subset of pictures in the plurality of contiguous subsets of pictures represents a different category in a plurality of categories, and each category in the plurality of categories is associated with a corresponding label in a plurality of labels. In the method, navigation proceeds through the plurality of pictures, responsive to user inputs for the wheel UI element, in accordance with the bi-directional linear order. Further, in the method, there is rendered, on the bar UI element, a plurality of indicia demarcating categories of the plurality of pictures. Further, in the method, there is indicated, on the bar UI element, representative positions of the rendered pictures within the ordered list. The bar UI element has a position indicating mode in which spacing between the indicia is dependent on a number of pictures of the corresponding category. In the method, a user input is received for the bar UI element in position indicating mode. Responsive to the user input, the bar UI element is transformed into a navigation mode where the plurality of selectable labels is displayed. Each selectable label in the plurality of selectable labels is in association with a corresponding indicium in the plurality of indicia. In the method a selection of a label is received. Responsive to the selection of the label, the bar UI element is transformed into position indicating mode, and a picture is rendered from the category associated with the selected label.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 12A-12E illustrate variations of a bar UI element in a position indicating mode, according to various embodiments of the present disclosure.

FIGS. 13A-13C illustrate variations of a bar UI element in a navigation mode, according to various embodiments of the present disclosure.

DETAILED DESCRIPTION

Figure 1A:
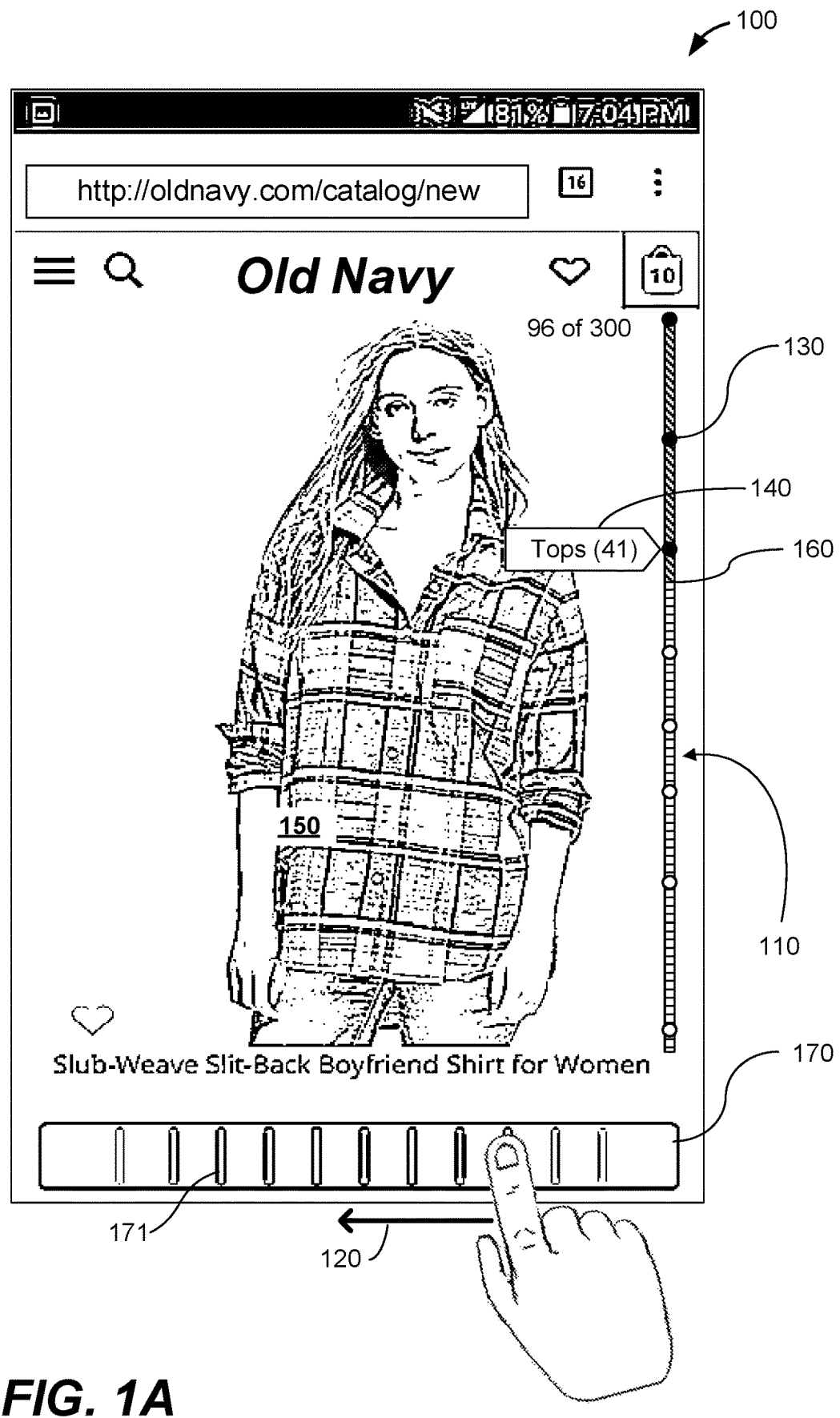
FIGS. 1A-1E are illustrations of a User Interface (UI) according to disclosed technologies.

Examples of the disclosed technologies provide for efficient traversal of collections of images or other records. The disclosed technologies are suitable for deployment on small touchscreen devices such as mobile phones, but are not limited to such devices. The disclosed technologies can be deployed on laptops, desktop computers, kiosks, and special purpose computer-implemented displays such as cameras or medical image viewing systems. The disclosed technologies can be employed for viewing collections of objects such as images in a wide range of settings, including library catalogs, personnel directories, educational materials, automobiles, books, clothing, general merchandise, music, videos, specialized or professional products, or search results. The terms "catalog" and "collection" are used interchangeably within this disclosure to represent any such object collection.

One aspect of the present disclosure provides a computing system comprising a touch-sensitive surface, a processor, and memory. The memory stores instructions for executing a method in which a plurality of images is accessed. The images are indexed in a data structure specifying a bidirectional order by which the images are to be accessed. A first image from the images is included in a module on the surface based upon the order. A navigation wheel and a bar UI element are included in the module. The bar UI element presents a current location indicator indicating a location of the first image within the structure. A directional input for the navigation wheel in a first direction is received, and, in response, the first image is replaced with a second image in the module from among the plurality of images based upon the order and the bar UI element is updated to indicate the second image location.

In examples, two user interface (UI) elements are operated cooperatively. A first UI element, such as a wheel, provides simple, precise, and variable continuous traversal. Depending on variables such as length, speed, and/or position, a single swipe can traverse from one to ten, twenty, fifty, a hundred or more images of a catalog, in either direction.

In examples, a catalog can be organized in sections, which can be e.g. categories of clothing, or genres of movies, neighborhoods of houses, model years of cars, or any other categorization. A second UI element, such as a bar, represents an instant catalog, and can visually indicate the various sections of the catalog along its length, and simultaneously the current viewing position (e.g. index number of an image) within a section of the catalog. Visual indication can be provided by rendering pixels on a display with distinguishing features relative to surrounding pixels, to form indicia.

In examples, the second UI element can be reconfigured to a navigation mode, in which all the catalog sections are labeled for easy selection, enabling jump navigation as a complement to the sequential traversal offered by a wheel. As used in this disclosure, navigation and traversal are both used to refer to moving through a catalog or other ordered collection, which can be guided according to inputs for one or more UI elements.

An Example User Interface

Features of an example user interface according to the disclosed technologies are described with reference to FIGS. 1A-1E.

FIG. 1A shows the UI 100 having a bar UI element 110 and a navigation wheel UI element 170. The bar 110 and navigation wheel 170 are interrelated, as moving the navigation wheel 170 changes position information on the bar 110. Because the bar 110 indicates a current position, this mode of the bar UI element is dubbed "position indicating mode." More particularly, if a user scrolls the navigation wheel 170, as shown by arrow 120, a current position 160 changes on the bar 110. Scrolling can be accomplished by sliding a finger, stylus, cursor, or other pointing object along navigation wheel 170. Additionally, scrolling 120 of the navigation wheel 170 results in new images being displayed from the catalog, typically one image at a time. In the illustrated example, the content includes a plurality of images associated with different clothes collections. The content is divided into categories separated by markers, such as marker 130. Portions of the bar 110 change color as the user traverses the content using the navigation wheel 170. Once a marker is reached, a category heading (e.g., see 140) is displayed indicating the current category in which the user is scrolling. The markers 130 also indicate a number of categories available for viewing. For example, there are eight markers shown in the bar 110. Therefore, there are eight categories of content in which the user can scroll. A relative size of each category is shown by the spacing between nodes 130. If the nodes are closer together, then the category contains less content. The current position 160 can concurrently indicate the sequential position of a currently displayed image within a catalog and within a category of the catalog, thus allowing a user to readily see where a currently displayed image is located in the overall content and within a current category. In one example, a category includes a plurality of images, such as image 150. In this example, a category having more spacing between nodes contains more images.

The traversed portion of the bar (e.g. above current position 160 in FIG. 1A) grows or shrinks vertically as the user moves forward/backward. The category heading 140 shows a specific category that the user has entered. For example, the category heading 140 indicates that the user has entered the "tops" category. The number in parenthesis indicates a number of items in the category (in this example, "41"). In some examples, the beginning of an image collection can be at the top of the bar, while in other examples the beginning can be at the bottom.

A bar correlates to and provides a visual representation of a landscape of the entire catalog at once. A user can select anywhere along the bar so as to traverse the catalog skipping all images between a current point and a selected point or a selected section on the bar.

As used in this disclosure, a bar UI element is any element having a single directional extent along which information can be presented. That is, the position of a feature, label, or marker can be used to convey information. Bars can have extent in a second direction different from the directional extent, and can include labels or markers offset from the bar in the second direction, however the position of a label, marker, or feature in the second direction does not convey information. While some bars generally have the appearance of a straight line of narrow or wide width, other bars can be curvilinear, segmented, or another shape.

Figure 1B:
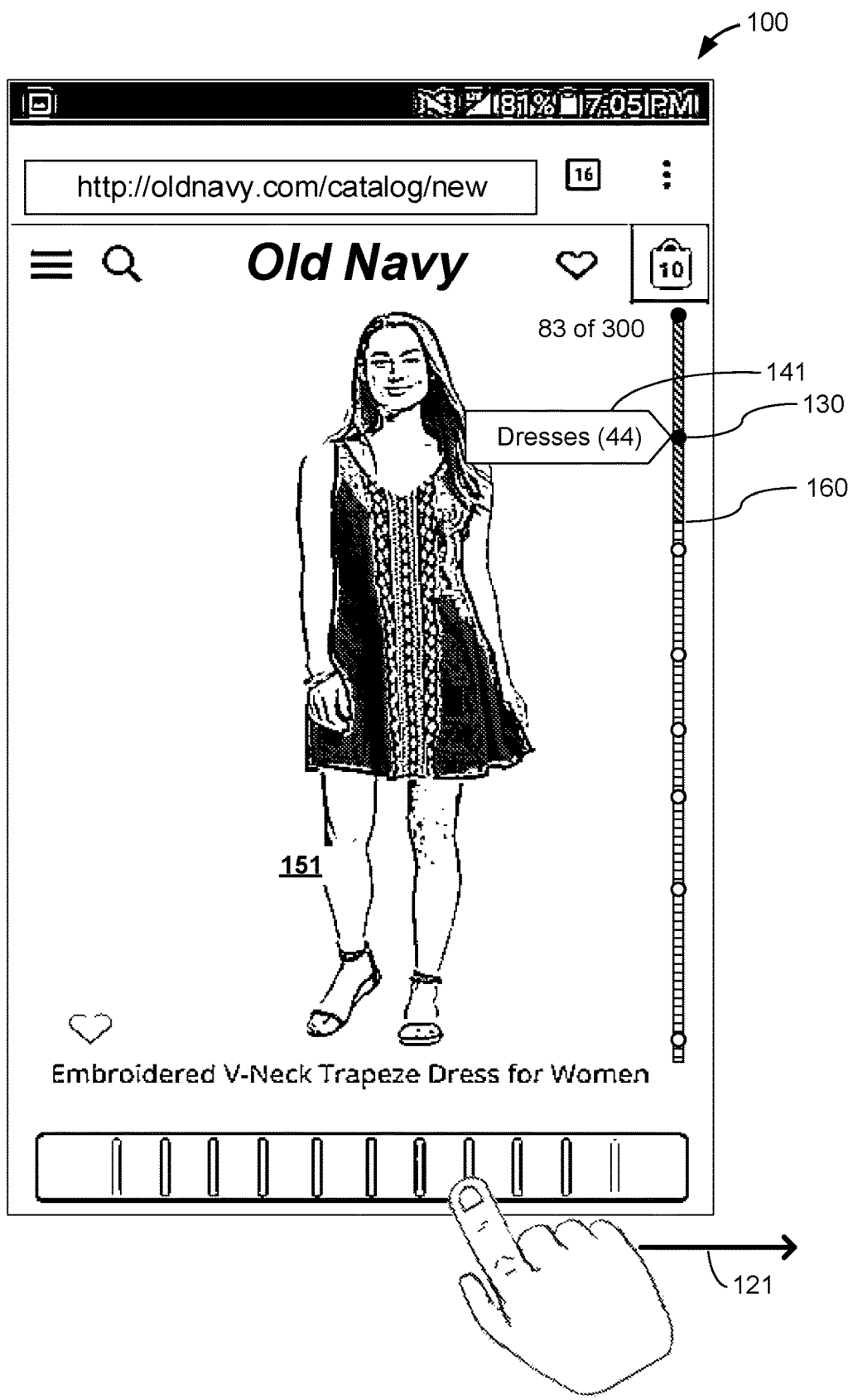

FIG. 1B shows an example of a bar in position indicating mode with label 141 appearing when a category is entered from the bottom. Notably, in FIG. 1B the user is scrolling in an opposite direction to FIG. 1A, as shown by arrow 121. Compared to FIG. 1A, the current position indicator 160 has moved upward due to the user's scrolling backward. Image 150 has been replaced by image 151. The category markers such as 130 have not moved. A haptic feedback can be provided each time the user enters a category whether moving forward or backward through the categories.

Thus, the navigational wheel 170 is a bidirectional control. The navigation wheel allows sequential traversing through a catalog of images without skipping images. The distance the user scrolls or moves the wheel left to right or right to left is directly related to a number of products displayed over that distance. For example, if a user moves the wheel by continuously swiping a finger the full width of the screen from right to left, then a total of ten products can be displayed, one at a time in sequential order. The speed of the scroll is directly related to the speed at which one product is replaced by the next product. As a result, both the length of a scroll and speed of a scroll can be used to determine how many products to display and a timing associated with how long (e.g., a duration) each of the products is displayed. The navigational wheel can provide a precise single-action user input with wide dynamic range—in this example, over one to ten images, in either direction.

In some examples, a scroll input over multiple images results in each of the multiple images being displayed, while in other examples one or more intermediate images could be skipped. A predetermined configuration parameter can be used to specify a minimum duration for which any image should be displayed, for example 0.1 second, 0.2 second, 0.5 second, 1.0 second, or any duration in the range 10 milliseconds-10 seconds. Another configuration parameter can be used to specify a maximum delay before the final image for the scroll input is displayed, for example 0.5 second, 1 second, 2 second, 5 second, 10 second, or any delay in the range 0.1 second to 100 second. Thus, as an illustration, a scroll over nine images can display the third image for 0.5 second, the sixth image for 0.5 second, and then display the destination (ninth) image at 1.0 second after the scroll is completed, in order to meet the configured display parameters. In another example, a scroll input may begin slowly, in which case the first few images are all displayed; when the scroll accelerates subsequently, one or more images can be skipped. By way of illustration, a scroll over nine images could display the first, second, third, fifth, and ninth images, while omitting display of the fourth, sixth, seventh, and eighth images. A scroll input can also start off quickly and end slowly, or follow some other temporal profile. A single scroll input can also combine forward and backward movements.

Figure 1C:
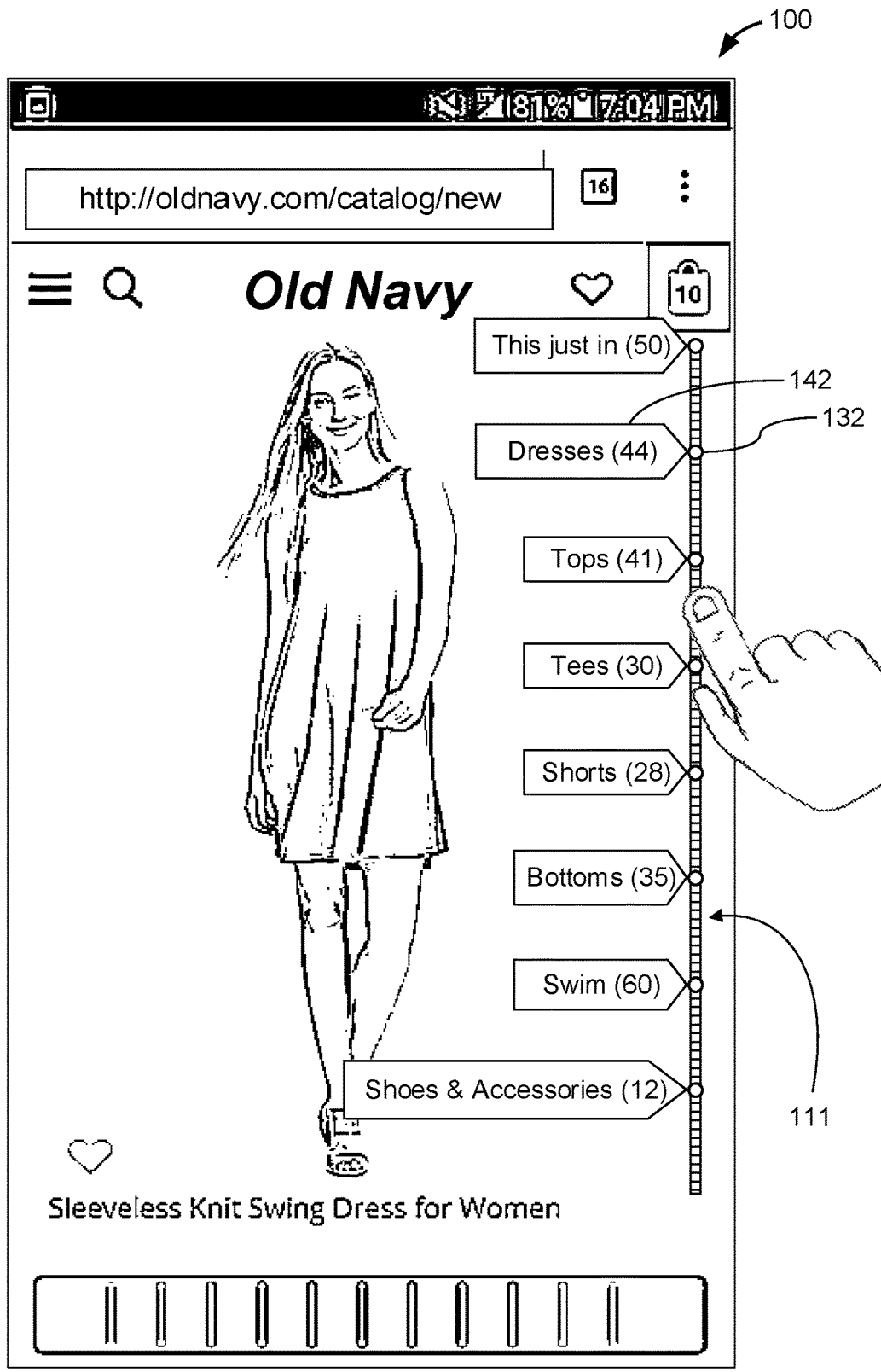

Turning to the bar UI element, FIG. 1C shows that tapping in the area of a position indicating bar (such as 110) causes the bar UI element 110 to reconfigure into "navigation mode" bar 111. In this mode, all of the section labels 142 are displayed alongside respective section markers 132. The section labels 142 are evenly spaced to facilitate display (prevent overlaps of adjacent small categories) and touch interaction (more space for the user to tap, less likelihood of mis-tapping). In examples, the position indicator 160 can be hidden in this mode since the spacing between section markers 132 no longer represents the relative sizes of the categories. When the user selects the label of a new category, the system caches the product images likely to be displayed next, which may be before or after the currently displayed product. The system performs caching of the nearby products in both the forward and backward directions in this scenario, to account for both directions a user may choose to go using the navigation wheel. Tapping a category label 142 jumps to the corresponding location in the image collection and displays the first product in that category. Also, the category headings 142 fade away and the navigation bar 111 reverts to "position indicating mode" (such as 110).

Figure 1D:
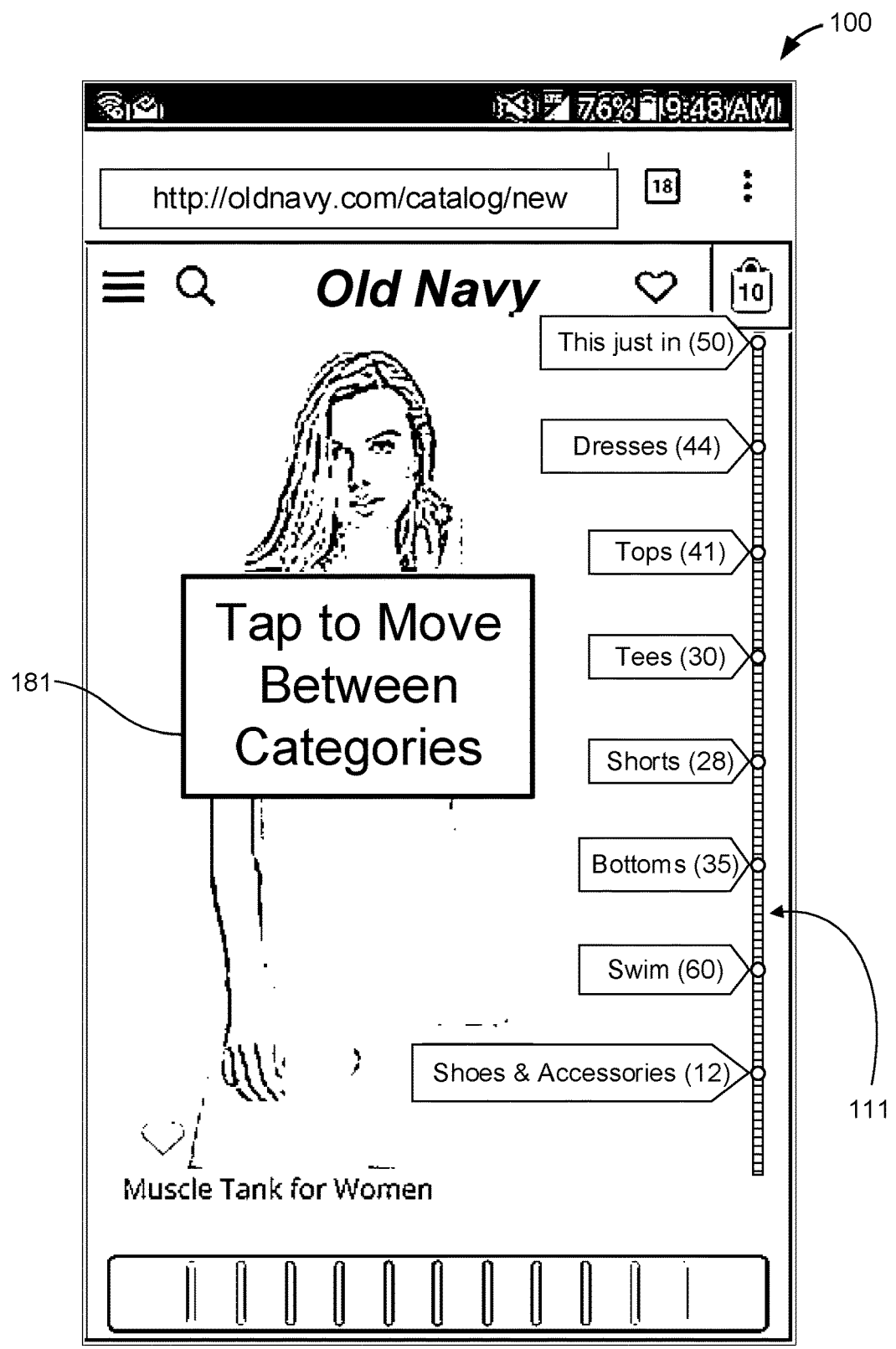

FIG. 1D shows a coaching mode. After a predetermined number of products have been viewed, indicating that the user has learned the basic navigation system, the UI 100 temporarily stops the primary UI action and grays out the product display to direct attention to the "navigation mode" bar 111. A help prompt 181 can be displayed to coach a user. The UI 100 can illustrate the use of the bar UI element 111 as a navigation mechanism and exposes the user to the full set of categories; in the example shown, each section label contains the category name (such as "dresses") and the corresponding count of products in that category (such as "44").

Operation of the navigation wheel 170 is described further with reference to FIGS. 1A-1B. Dragging the wheel moves the user through the products or other content. Dragging to the left, as shown by arrow 120, is forward, while dragging right (arrow 121) is backwards. In other examples, the wheel direction can be reversed, e.g. dragging to the right can be forward traversal. These gesture inputs generate GUI events which update the rendered image and change the position indication on the bar UI element 110 to correspond. In examples, the list of products loops in the sense that if the user moves forward past the last product, the first product is displayed and navigation continues from the start. Looping can also be implemented when moving backwards, if user is on the first product and drags right to go backwards, the last product is displayed and navigation will continue from the end. Moving backward through the products can be disabled until the user has navigated past the last product for the first time and looped back to the first. In other examples, looping can be restricted to be over a single category and not across the entire collection of images.

Figure 1E:
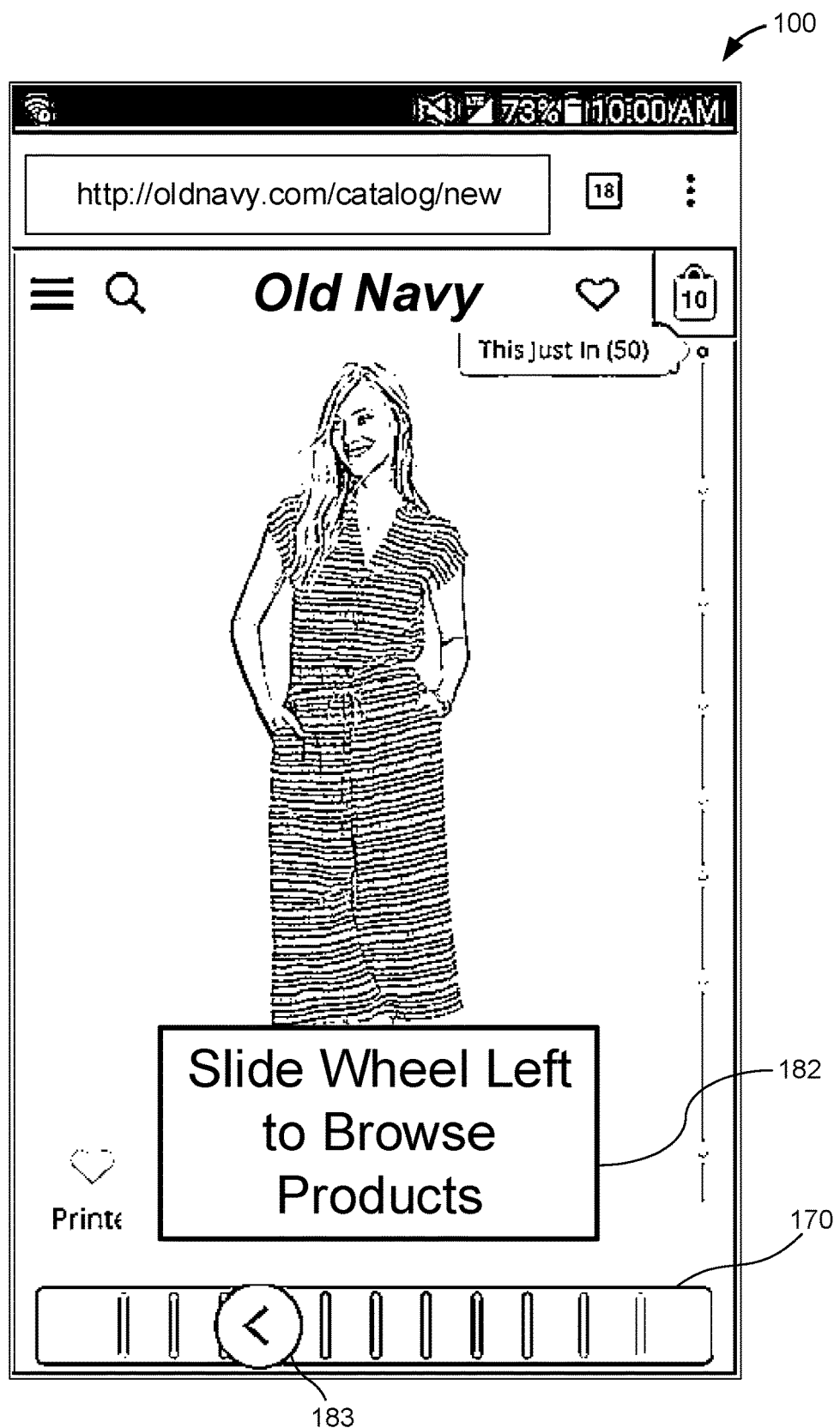

FIG. 1E is an example of navigation wheel coaching. Coaching can be displayed on initial load of the GUI 100, and draws attention to the wheel UI 170. The coaching includes a help prompt 182 and an animation 183 indicating the wheel 170 and the intended drag direction. The coaching screen can be configured to persist until the user interacts with the wheel 170 in the desired manner. For example, the wheel 170 can "bounce" visually if the user performs any action on the screen other than the intended dragging of the wheel 170; in some examples, haptic feedback can be used.

A First Example Method

Figure 2:
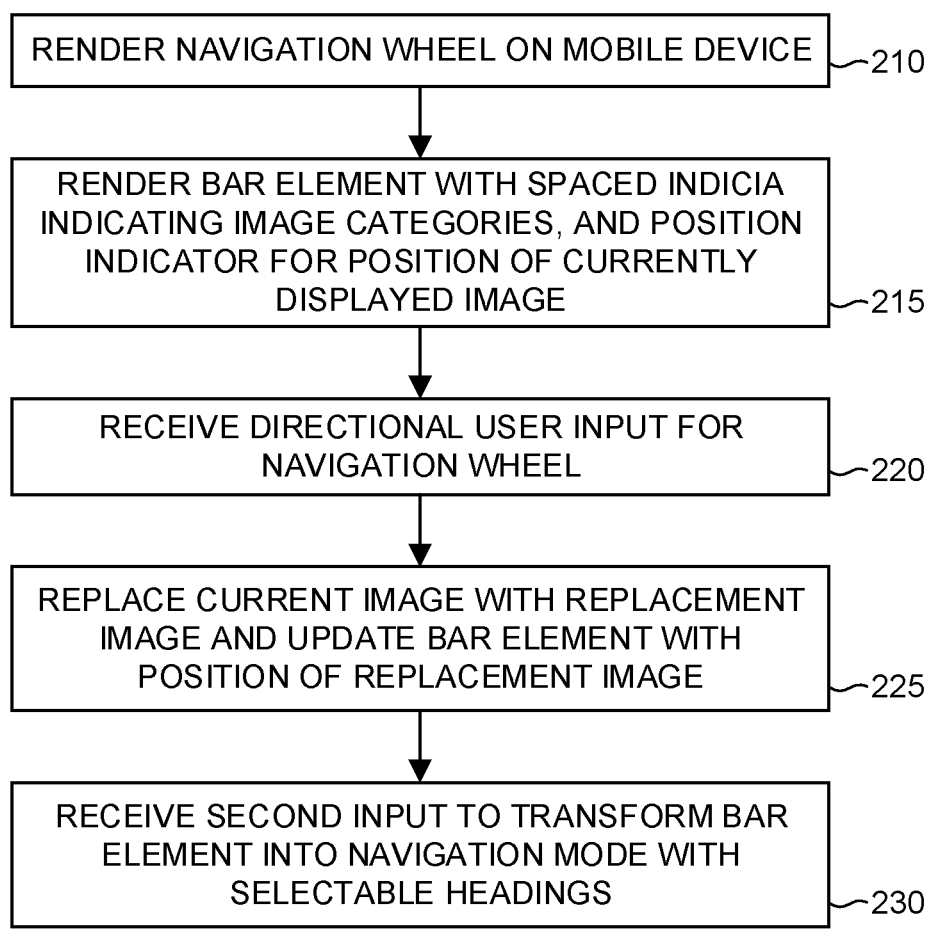
FIG. 2 is a flowchart of a method for navigating through a user interface on a mobile device according to disclosed technologies.

FIG. 2 is a flowchart 200 of a method for navigating through a user interface on a mobile device according to disclosed technologies. At process block 210, a navigation wheel is rendered on the mobile device. At process block 215, a bar element is rendered multiple indicia indicative of respective categories of images. The spacing between indicia can indicate an amount of content in each category. Another indicia on the bar UI element can indicate a location of where a currently displayed image is within its category.

As used in this disclosure, the term "indicia" can be singular or plural; an indicia is any visually discernible marker or feature that conveys information. A marker can be a filled or unfilled circle, polygon, or other shape; or a group of pixels represented in one or more colors different from colors of neighboring pixels; or a text label or image. A feature can be an attribute of one or more other objects rendered in a UI. For example, in a segmented bar in which two abutting segments are rendered in different colors, the junction between the two segments is a feature that can convey information and can be an indicia. Likewise, a visually discernible gap between two segments can be an indicia, even if the gap pixels are the same color as a background color.

At process block 220, a directional user input is received for the navigation wheel UI element. Based on the directional user input, the currently displayed image is replaced with a replacement image at process block 225. The currently displayed image and the replacement image can belong to the same or different categories of images. The bar UI element is also updated at process block 225 to indicate the location of the replacement image. At process block 230, a second user input is received for the bar UI element. The second user input causes the bar UI element to be transformed to a navigation mode. In the navigation mode, a heading or label is displayed alongside each category-indicating indicia. The headings or labels are selectable to cause the displayed image and its corresponding position indicator to jump to the category associated with the selected label.

A Second Example Method

Figure 3:
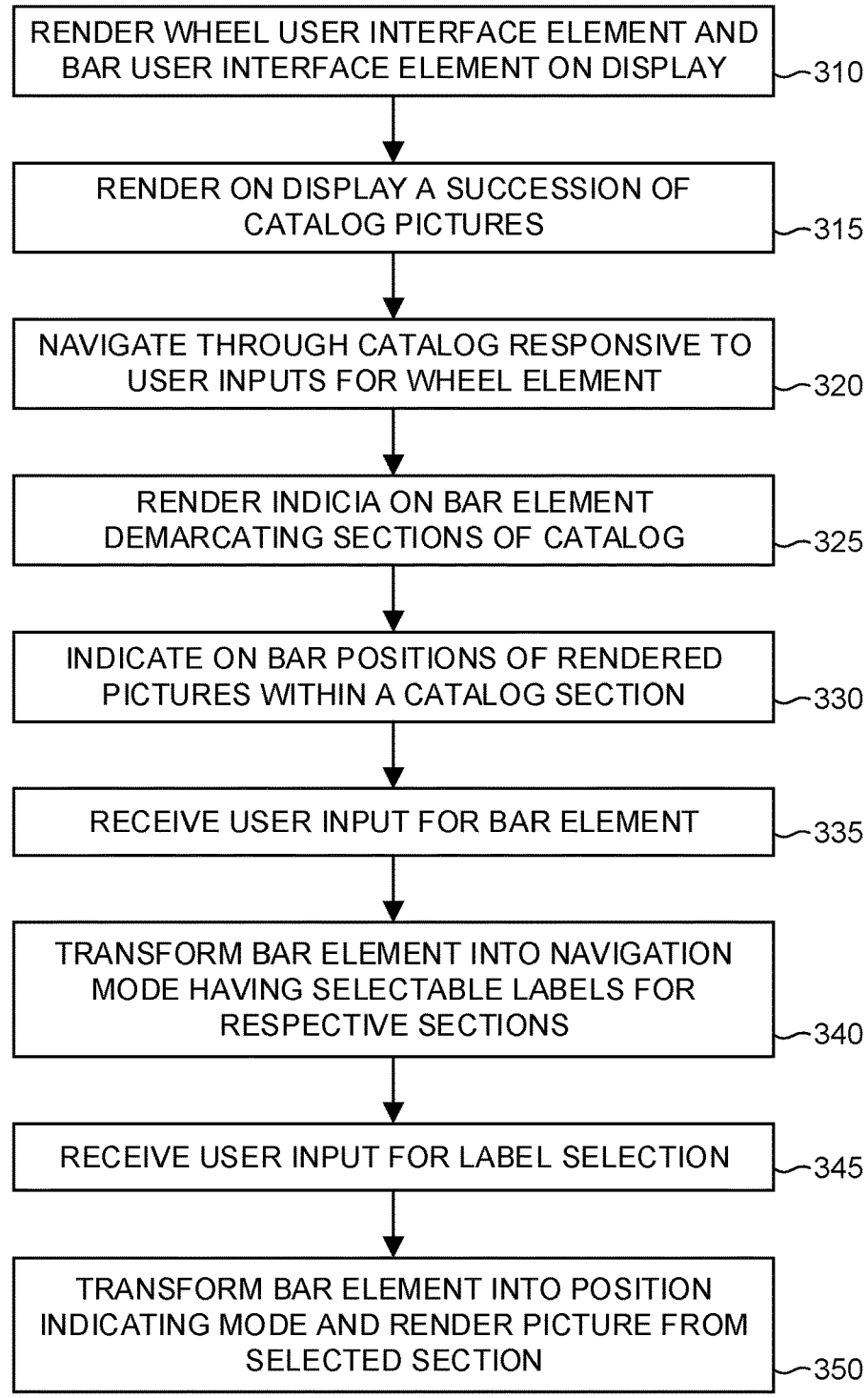
FIG. 3 is a flowchart of another method according to the disclosed technologies.

FIG. 3 is a flowchart 300 of another method according to the disclosed technologies. At process block 310, a wheel UI element and a bar UI element are rendered on a display. At process block 315, a succession of pictures from a catalog are displayed. At process block 320, user inputs for the wheel are used to navigate through the catalog of pictures. At process block 325, a plurality of indicia are rendered on the bar UI element to demarcate sections of the catalog, so that the bar UI element represents the catalog, and the portion of the bar UI element between successive pairs of adjacent indicia represent the catalog sections. At process block 330, positions of rendered pictures are rendered within a section of the catalog, or within respective sections of the catalog. At process block 335, a user input for the bar UI element is received. Responsive to this user input, the bar UI element is transformed into a navigation mode at process block 340. The navigation mode bar UI element has multiple evenly spaced labels that are displayed in association with respective indicia or (equivalently) in association with respective catalog sections. At process block 345, a user input is received to select a label for a section. Responsive to this user input, the bar UI element is transformed back into a position indicating mode at process block 350, and a picture from the catalog section associated with the selected label is rendered on the display.

A Third Example Method

Figure 4:
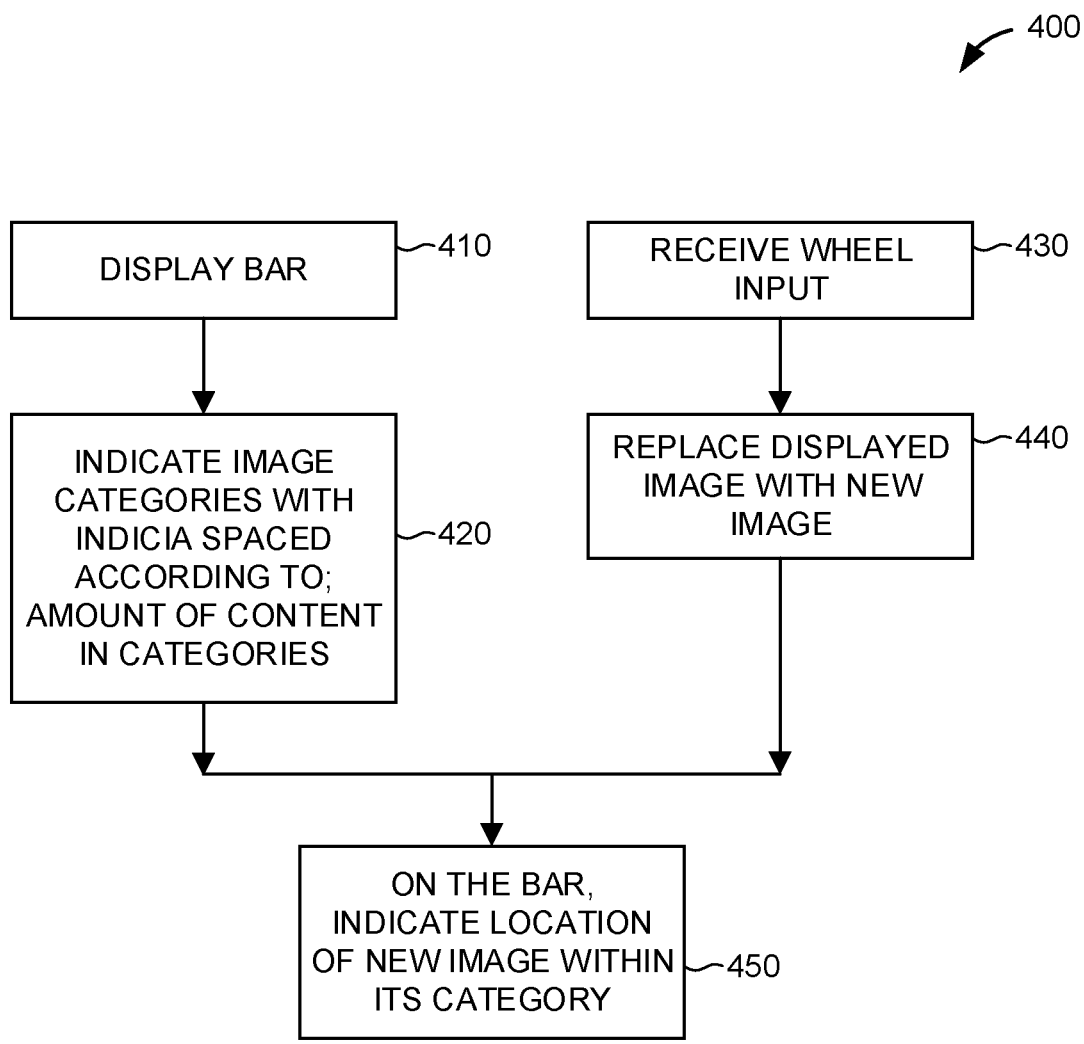
FIG. 4 is a flowchart of a method of navigating through content according to disclosed technologies.

FIG. 4 is a flowchart 400 of a method for navigating through image content according to disclosed technologies. At process block 410, a bar UI element is displayed. At process block 420, indicia are rendered on the bar to indicate image categories; the indicia are spaced according to the amount of content in the categories. Independently, at process block 430, input is received for a navigation wheel UI element. Based on this, a currently displayed image is replaced with a replacement image from the image content at process block 440. Finally, at process block 450, the position of the replacement image within its category is displayed on the bar UI element. The bar UI element and the navigation wheel UI element are said to be integrated because their operations are interrelated: scrolling the navigation wheel UI element changes the location indication in the bar UI element. However, changing the location in the UI bar does not change a wheel position. In this sense, the bar UI element and the navigation wheel are considered one-way interrelated.

A Fourth Example Method

Figure 5:
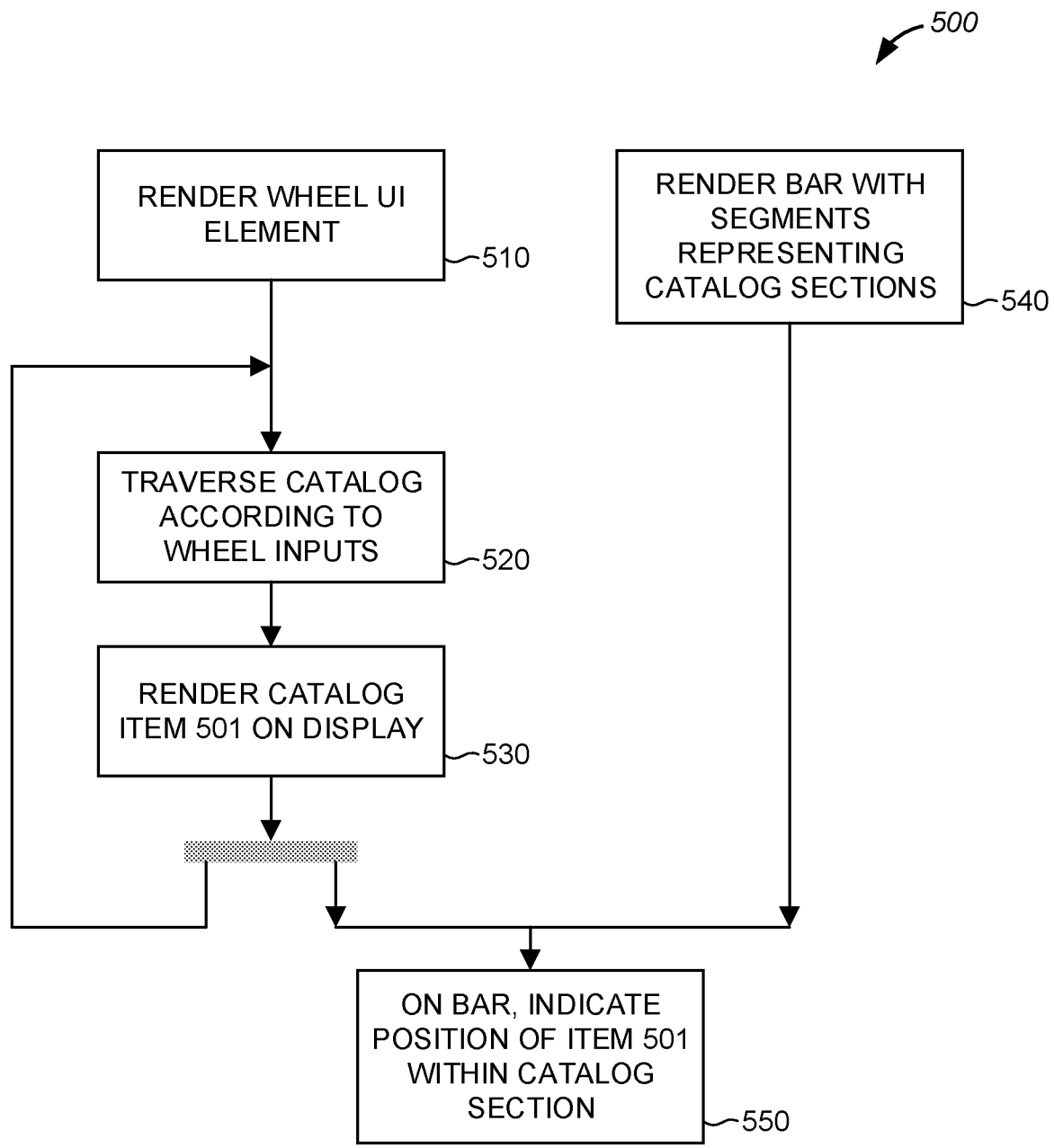
FIG. 5 is a flowchart of a method for traversing a catalog according to disclosed technologies.

FIG. 5 is a flowchart 500 of a method for traversing a catalog according to disclosed technologies. At process block 540, a bar UI element is rendered with segments representing sections of the catalog. At process block 510, a navigation wheel UI element is rendered. At process block 520, wheel inputs are used to traverse the catalog, as described herein. At process block 530, a current catalog item 501 is rendered on the display, following which the method forks. The left fork loops back to process block 520 to continue traversal of the catalog. The right fork proceeds to indicate the position of item 501 within its catalog section.

A Fifth Example Method

Figure 6:
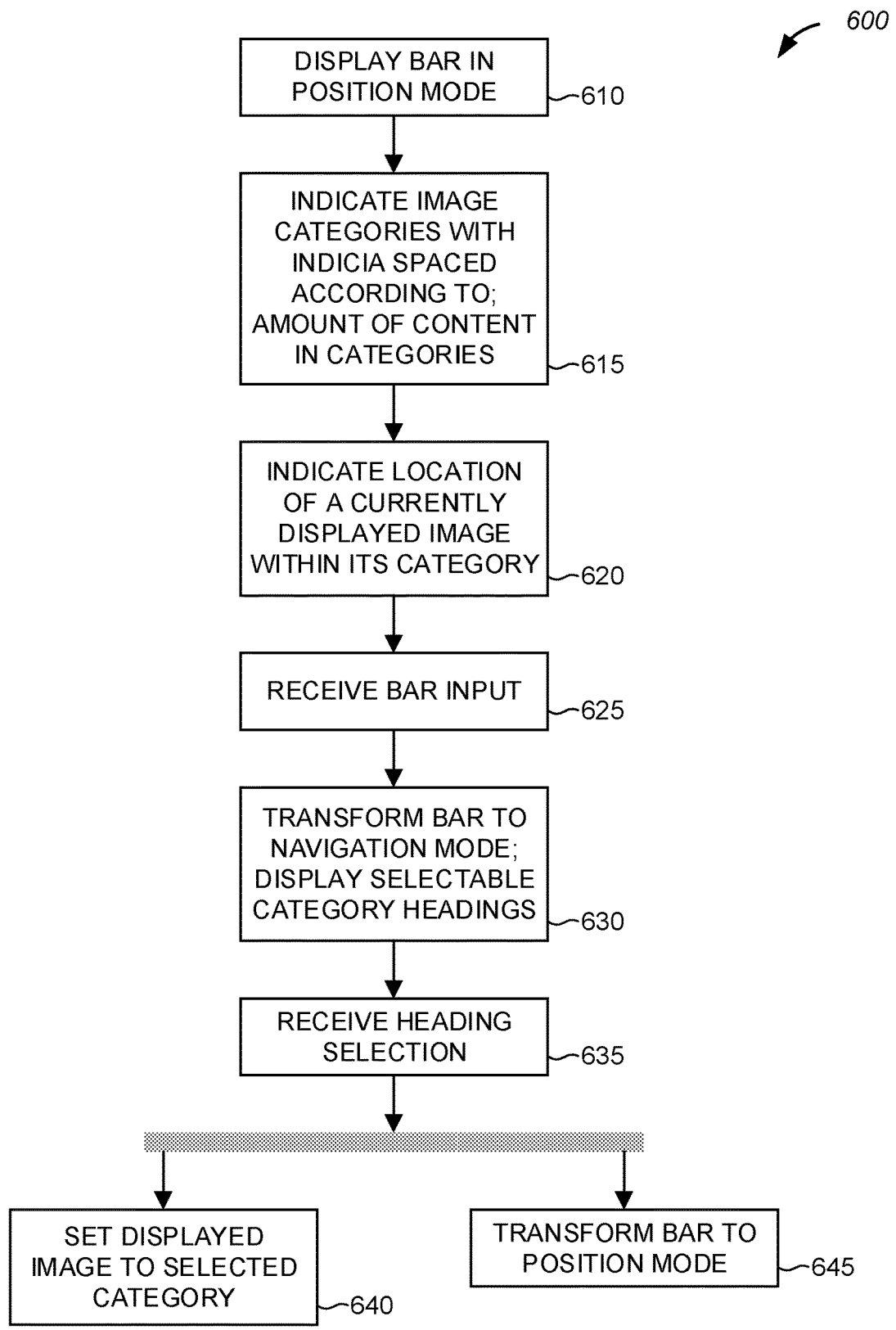
FIG. 6 is a flowchart of a method for navigating through a user interface according to disclosed technologies.

FIG. 6 is a flowchart 600 of a method for navigating through a user interface according to disclosed technologies. A bar UI element is displayed in position-indicating mode, and transformed into navigation mode.

At process block 610, a bar UI element is displayed, in a position-indicating mode. At process block 615, indicia of image categories are displayed on the bar UI element; segments of the bar between successive pairs of indicia represent respective categories. The indicia are spaced apart according to the amount of content in the categories. By way of illustration, a segment between third and fourth indicia can represent the third category, and the size of this segment can be based on the amount of content in the third category.

In some examples, the segment lengths (equivalent to indicia separation) can be linearly proportional to the amount of content, so that if two categories have content in the ratio 4:1, then the segment lengths are also in the proportion 4:1. In other examples, where variations in category sizes are very large, other monotonic functions can be used, such as square-root, or logarithm. For the square-root case, two segments having content in the ratio 4:1 could have segment lengths in the ratio 2:1. In the logarithmic case, a category having N images could have a segment length proportional to log(N), with any logarithmic base, or proportional to log(N+c) or c+log(N), where c is a constant, which can be a positive number, such as 1, and N is a positive integer. Floor and ceiling functions can also be used, so that a segment length is never less than a minimum floor value, or never exceeds a maximum ceiling value. Blended functions can also be used. For example, segment lengths can be proportional or approximately proportional to N for values of N below a first threshold, transition to being proportional or approximately proportional to square-root of N over an intermediate range of N, and transition to being proportional or approximately proportional to log(N) above a second threshold.

In some examples, the indicia are markers, while in other examples, the indicia are features associated with the segments, and process blocks 610 and 615 are performed concurrently. At process block 620, the position of a currently displayed image within its category is indicated on the display. In examples, the position is indicated by an indicia on or alongside the bar UI element.

At process block 625, an input for the bar UI element is received, which can be a tap or a pointing device event within a region of an active display area that is associated with the bar UI element responsive to the bar input, at process block 625, the bar is transformed from position indicating mode to navigation mode. In the navigation mode, selectable headings are displayed for each category in visual association with respective bar segments or indicia. In some examples, the selectable headings are evenly spaced. As part of the transformation, the indicia for one or more categories can slide along the bar UI element.

At process block 630, a heading selection is received on the navigation mode bar UI element, leading to a fork. On the right fork, the bar is transformed back to position indicating mode at process block 645. On the left fork, the category associated with the selected heading is determined, and an image from the selected category is displayed. In examples, the displayed image is the first image in the selected category, or a median image, or the last image, or a randomly chosen image, or some other image. In other examples, the displayed image reverts to the last image that had previously been displayed from the selected category, if the selected category has been previously viewed.

An Example GUI Architecture

Figure 7:
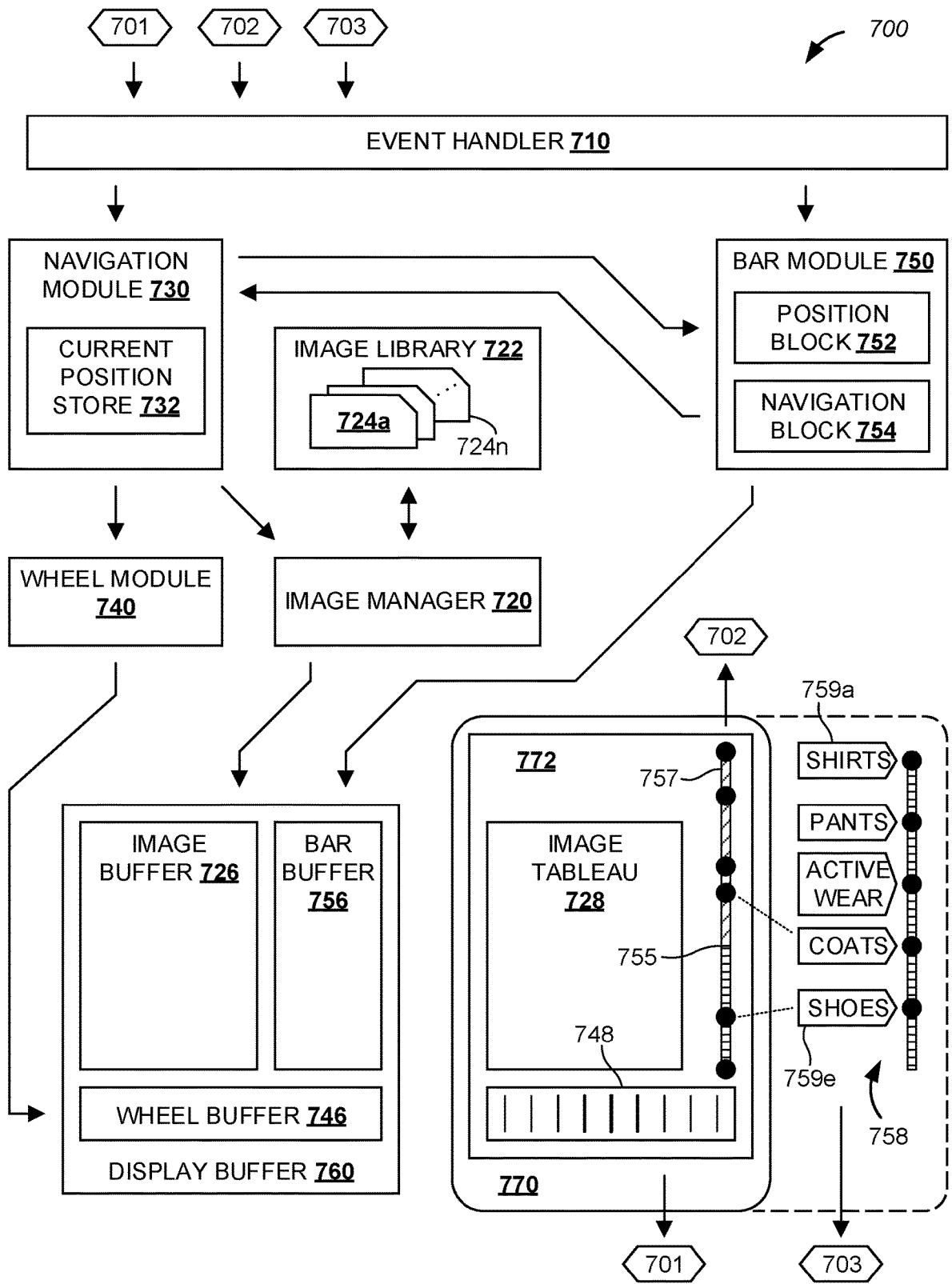
FIG. 7 is a block diagram of a system implementing a GUI architecture according to disclosed technologies.

FIG. 7 is a block diagram of a system implementing a GUI architecture according to disclosed technologies. The GUI is rendered on a display having an active display area 772 on device 770. Rendering can be performed by writing image pixel data to a display buffer 760 and controlling pixels of display area 772 according to respective image pixel data in the display buffer. The GUI is operable to display a succession of images or other content in an image tableau 728 in conjunction with a navigation wheel UI element 748 and a bar UI element having two modes shown as 757 and 758. The bar 757 is in position-indicating mode, while bar 758 is in navigation mode.

In examples, the GUI architecture includes an image manager 720, a navigation module 730, a wheel module 740, and a bar module 750. The GUI architecture is operable in an environment that includes device 770, which can have one or more processors, one or more displays 772, one or more display buffers 760, display drive circuitry, a power supply, and other features of a computer system described herein. The environment can also include software or data components such as image library 722, an operating system, a browser, an event handler, one or more display drivers, and a rendering engine. In some embodiments, one or more of the described environmental components can be incorporated into the GUI architecture, while in other embodiments, a system can include some or all of the objects depicted in FIG. 7, with optionally some additional components.

Although FIG. 7 is described with references to images, particularly images of clothing from a library, the GUI architecture is not limited to images. In certain examples, images can be pictures or photographs of objects that have a tangible physical instantiation outside of computer-readable media with a value exceeding the value of the image. Images can be pictures of clothing, houses, people, merchandise, or food. In other examples, images can be pictures or photographs of tangible scenes, where the images can contain representation of tangible objects having value or even priceless objects, but the image has an intrinsic value distinct from any objects portrayed. Such images can include scenery, vacation pictures, selfies, or documentary evidence. In further examples, images can have value similar to a printed version of the image, such as documents or electronic art. The described GUI architecture is suitable for any of such images. Finally, the GUI architecture can display and navigate through collections of items that do not principally exist as images, but are only rendered as images at run-time for the purpose of visualization on display 772. Such items can include text-mode items or database fields or records. The described GUI architecture is suitable for any such item collection also.

At a high level, navigation module 730, image manager 720, and bar module 750 cooperate to present images from image library 722 on the display 772, and to navigate through the image library 722 based on inputs received from event handler 710 for a wheel UI element 748 and a bar UI element 758. A wheel module 740 drives rendering of the wheel UI element 748 and can provide motion or other features associated with the wheel UI element 748.

Navigation module 730 is connected between event handler 710 and image manager 720, and includes a computer-readable storage location 732 for a current position that represents a location of a currently displayed image within the image library 722. By way of illustration, if the images 724*a-n* are in sequential order and the currently displayed image is 724*a*, then current position store 732 can contain the index value of image 724*a*, which can be "1" (or "0," if 0-based indexing is used). Similarly, current position store 732 can store "3" if the currently displayed image is 724*c*.

Navigation module 730 is operable to receive e.g. a wheel event from event handler 710, and update the current position 732 accordingly. For example, a left-swipe of the wheel can lead to decrementing the current position 732 by one or more units, while a right-swipe of the wheel can lead to incrementing the current position 732 by one or more units. The action on the bar UI element 757 is indicated by the arrow to tag 701, which connects to the event handler 710. The value in the current position store 732 is provided to image manager 720 and is used to access the appropriate image 724 from library 722. Although shown as a unidirectional arrow, in some examples, image manager 720 can fetch the current position from current position store 732. The current position is also provided to bar module 750. In position-indicating mode, the current position is used to show the position of the currently displayed image within the image library 722, or within a particular section of the image library 722. Thus, a wheel event can cause both the indicated position and the displayed image to be updated in tandem.

The event input received by navigation module 730 can also be provided, with optional processing, to wheel module 740 to provide visual feedback of the received input. For example, a left-swipe of the wheel can lead to indicia on the wheel appearing to move to the left, while a right-swipe can lead to indicia motion to the right. Wheel module can write the indicia into wheel buffer 746, either directly or through intermediary software components.

Image manager 720 is coupled between image library 722 and image buffer 726, and is operable to access a current image from image library 722 and write the current image into image buffer 726, either directly or through intermediary software components. In examples, the current image can be resized to fit the size of image tableau 728 on device 770. In examples, the image manager 720 can access a low-resolution version of the current image from image library 722 if a high-resolution is not available, or not yet available. The image manager 720 can provide a graphical or textual indication of waiting or loading if the current image is in process of download.

Bar module 750 is coupled to receive inputs from the event handler 710 or from the navigation module 730, and to provide outputs to the navigation module 730 and the bar buffer 756. When the bar UI element is in position-indicating mode 757, an event generated by a tap on the bar UI element 757 can be received from event handler 710 and can lead to re-drawing of the bar UI element in navigation mode 758. The tap on the bar UI element 757 is indicated by the arrow to tag 702, which connects to the event handler 710. When the bar UI element is in navigation mode 758, an event generated by a tap on the bar UI element (or, more precisely, on one of the section labels 759*a-e*) can lead to re-drawing of the bar UI element in position-indicating mode 757. The tap on the bar UI element 758 is indicated by the arrow to tag 703, which connects to the event handler 710. Selection of a section label 759 indicates selection of the corresponding section of the image library 722; this information is routed from the bar module 750 to the navigation module 730 so that current position store 732 and the currently displayed image can be updated.

Bar module 750 is also operable to receive current position information from navigation module 730, and update the current position indication on position-indicating bar 757. As shown in FIG. 7, indicia 755 is a feature depicted as a change in shading or coloring on the bar UI element 757, and indicates the position of the currently displayed image within the Coats section. (The Coats section is represented by a segment of the bar 757 between the Coats section marker and the Shoes section marker.)

Within bar module 750, display of the position-mode bar 757 is handled by a position block 752, while display of the navigation-mode bar 758 is handled by navigation block 754.

Connections between image buffer 726 and image tableau 728, between bar buffer 756 and bar UI element 757/758, and between wheel buffer 746 and wheel UI element 748 are not shown in FIG. 7.

The GUI architecture can be implemented within a browser, or as a stand-alone application. The GUI architecture can support additional functions and can incorporate additional components to provide these functions. Such functions can include coaching mode, additional UI elements such as: text indicators associated with a displayed image, buttons for exiting the GUI or launching other functions, links associated with specific displayed objects, buttons for bookmarking an item, or buttons for collecting one or more groups of items.

As used in this disclosure, the terms "GUI" (graphical user interface) and "UI" are used interchangeably. Examples of disclosed technologies can incorporate graphical UI elements. Use of the term GUI does not imply exclusion other forms of sensory interaction, such as spoken, auditory, touch, or haptic.

A Sixth Example Method

Figure 8:
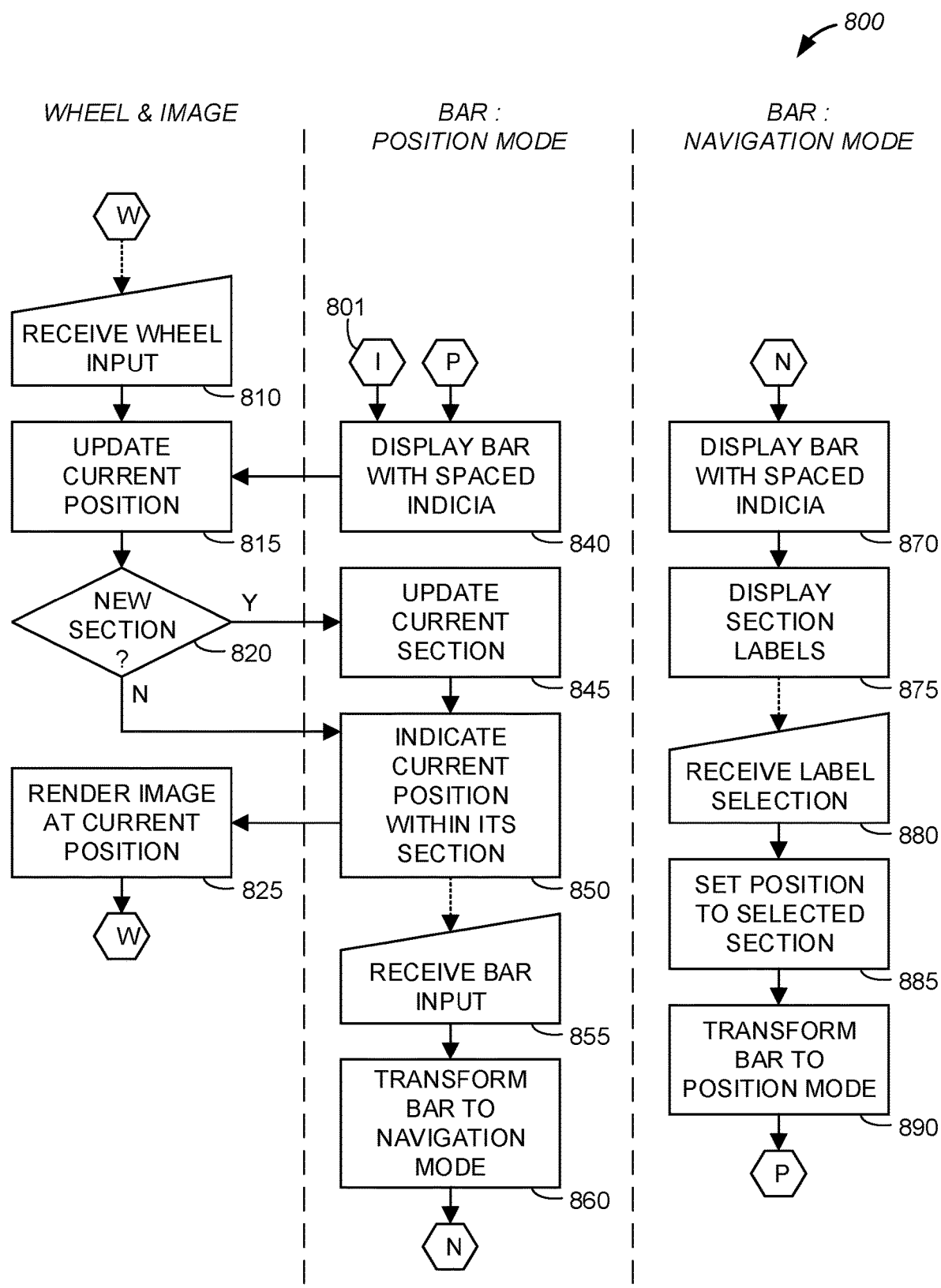
FIG. 8 is a flowchart of a method for providing a user interface according to disclosed technologies.

FIG. 8 is a flowchart 800 of a method for providing a user interface according to disclosed technologies. The flowchart 800 uses swim lanes to depict the actors or roles associated with the actions depicted in this illustrative example. The left lane is titled "Wheel & Image" and can be performed by a processor executing software instructions that are associated with one or more of a wheel interface module, a navigation module, or an image manager. The middle lane is titled "Bar:Position Mode" and can be performed by a processor executing software instructions associated with position-indicating mode in a bar manager module. The right lane is titled "Bar: Navigation Mode" and can be performed by a processor executing software instructions associated with navigation mode in a bar manager module.

The method of FIG. 8 is event-driven, and a description of FIG. 8 follows starting from the several depicted driving events. The driving events can be generated by a user making a tap or gesture on a touch-screen display; these events can be routed by an event handler to software components of a GUI architecture as appropriate.

Wheel Input Event.

At process block 810, an input event for a navigation wheel is received, as a result of which a current position is updated at process block 815. At process block 820, a check is made whether updating the position has changed a catalog section within which the current position is located. If yes, then the Y branch is followed, and at process block 845 the position mode bar manager updates the current section as needed. In some examples, entering a new section, in either the forward or backward direction, can cause a label of the newly entered section to be displayed, either temporarily or persistently. From process block 845, the method proceeds to process block 850. If at 820 the section is unchanged, then the N branch leads directly to process block 850.

At process block 850, the current position is updated within a segment of the bar UI element representing its section, and control proceeds to process block 825 where the new image at the updated current position is rendered on the display. One of ordinary skill will appreciate that process blocks 820, 845, 850, and 825 can be rearranged in several ways, while retaining the same or equivalent functionality. For example, process block 820 can be performed between process blocks 810 and 815, in which case the image is updated before the position indicator is updated. Particularly, update of the displayed image and update of the position indicator can be performed substantially simultaneously, which means that the updates appear, to a user, to be associated with each other and to the wheel input. In examples, the time interval between the beginning (or, completion) of the image update and the beginning (or, completion) of the position update can be less than or equal to 50 ms, 100 ms, 200 ms, 500 ms, or 1 second.

Following process block 825 in the example shown, the method follows tag "W" to loop back to the top and wait for another wheel input. In FIG. 8, the dotted line arrow leading in to process block 810 indicates that waiting could be required.

Meanwhile, in the middle lane, the position-mode bar manager module can wait after process block 850 until a bar input is received at process block 855, or until further inputs are received from another lane (such another wheel input).

Input to Position-Indicating Mode Bar Element.

At process block 855, an input is received from the event manager, indicating an input (such as a tap or mouse event) on the position-mode bar UI element. As a result of this event, the bar UI element is transformed from position-indicating mode to navigation mode at process block 860. Following transformation, the method follows tag "N" to continue in the navigation-mode bar module lane. At process block 870, the bar is displayed with spaced indicia, and section labels are displayed at process block 875. While drawn separately, process blocks 860, 870, and 875 can be combined, rearranged, or redistributed. In some examples, indicia designating the sections slide, move with animation, or are otherwise modified during the transformation 860 or 870, while in other examples, the indicia are unchanged between position-indicating mode and navigation mode. In examples, the section labels rendered at process block 875 are evenly spaced. Following completion of process blocks 860, 870, 875, the method waits to receive e.g. a label selection input at process block 880, as indicated by the dotted line arrow leading to 880.

Input to Navigation Mode Bar Element.

A label selection is received at process block 880. In examples, each section label is treated as an independent UI element having an associated screen area, and can receive associated events directly. In other examples, an area covering the entire navigation mode bar UI element, including all section labels, is handled as a single UI element, and event coordinates are processed within the GUI architecture to determine which label was selected. Regardless of the underlying UI element structure, at process block 880, a selection identified with a particular section label is received. At process block 885, a current position is set within the selected section, and at process block 890, the bar UI element is transformed back into position-indicating mode. This transformation can include removal of some or all of the section labels, retention of the selected section label either temporarily or persistently, and sliding of section markers. The method follows tag "P" to continue in the position-mode bar module lane.

At process block 840, the bar is displayed with indicia spaced according to sizes of respective sections. In examples, some functions of process blocks 885, 890, and/or 840 can be combined or rearranged. Following 840, the method proceeds to process blocks 815 onward, where the current position, current section, indicated position, and displayed image are updated as previously described.

The currently displayed image and the current position can be controlled by both the navigation wheel UI element (for smooth sequential scrolling) and the bar UI element (for jumps to a selected section when the bar UI element is in navigation mode). Thus the wheel and bar UI elements provide integrated control of navigation, supporting precise variable sequential motion as well as discontinuous jumps through sections of an object collection.

Initialization.

Another aspect of FIG. 8 pertains to initialization, so that UI elements can be prepared prior to receiving event-generating inputs. In the illustrated example, initialization of the method begins at tag 801 "I", which leads to drawing of the bar UI element in position-indicating mode at process block 840. During an initialization, initial values are set for both section and current position. In some examples, the UI can be initialized to the first image of the first section, while in other examples, the UI can be initialized according to a saved state from a previous operation of the UI, or the UI can be initialized according to a value targeted to a user's preferences or profile.

Example Pixel Calculation for Section Markers.

Figure 9:
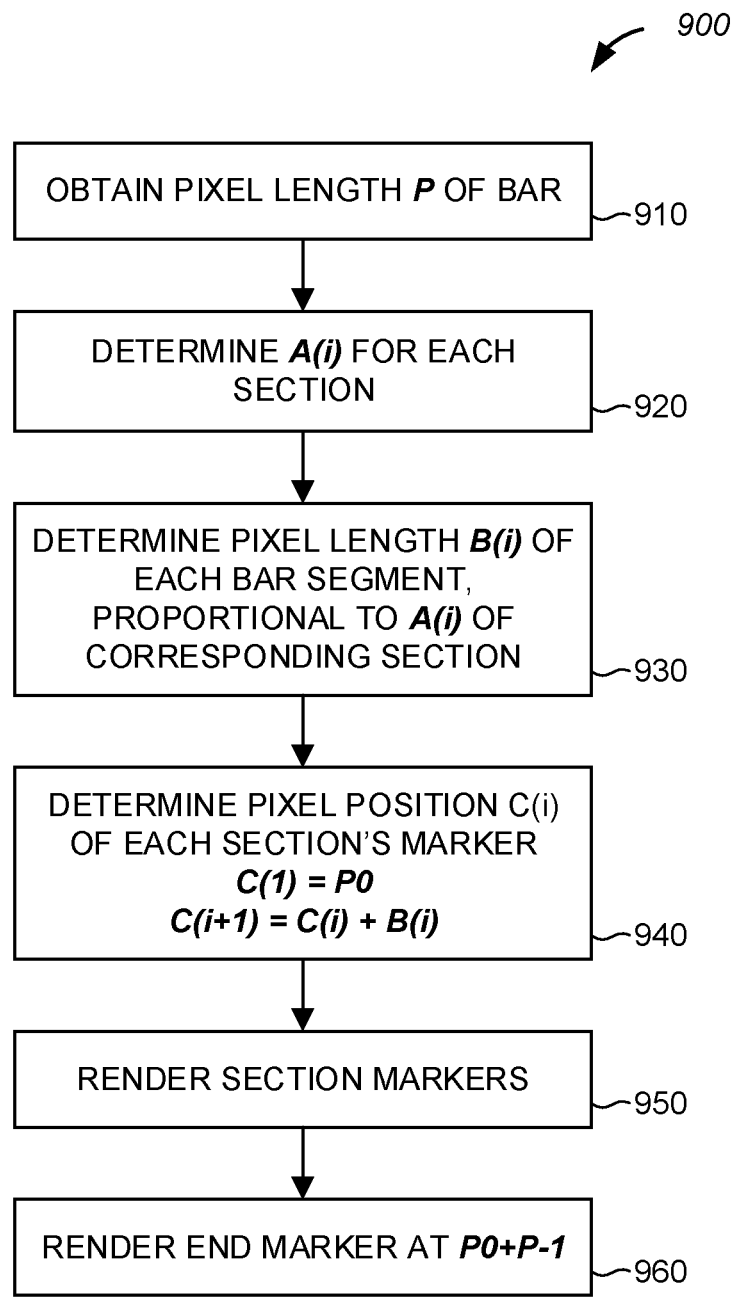
FIG. 9 is a flowchart of a method for spacing indicia according to disclosed technologies.

FIG. 9 is a flowchart of 900 a method for spacing indicia of a bar UI element according to disclosed technologies. This illustrative method is presented in context of a straight bar UI element aligned with a pixel grid of a display, where pixel position is equivalent to a coordinate along the bar UI element, and calculates the pixel position of indicia demarcating respective sections of a catalog.

At process block 910, a pixel length P of the bar UI element is obtained. The sections are indexed by variable i, and at process block 920 an amount $A(i)$ of content is determined for each section. In examples, $A(i)$ can be a number of images, of catalog items, or of records. In other examples, $A(i)$ can be indicative of a total size of the objects in the $i^{th}$ section, which can be measured in bytes, or pages, or in another unit.

At process block 930, pixel lengths $B(i)$ for the sections are determined. As shown, $B(i)$ can be proportional to $A(i)$, and $B(i)=(P \times A(i))/\Sigma_k A(k)$, adjusted by rounding or truncation to an integer value, and where k is a dummy variable running over all the sections. In other examples, the dynamic range of the $A(i)$ can be large, and the segment lengths for the various sections can be set proportional to a monotonic function F of $A(i)$, such as square-root, or some other power p, $0<p<1$, or logarithm, or some other blend or variation of functions. In such examples, $B(i)=(P \times F(A(i)))/\Sigma_k F(A(k))$.

At process block 940, the pixel position of the indicia is calculated. The first indicia is set to the pixel coordinate P0 of the beginning of the bar UI element, thus $C(1)=P0$. Successive indicia are positioned at pixel coordinates $C(i+1)=C(i)+B(i)$. At process block 950, the section markers or other indicia are rendered at these pixel coordinates $C(i)$. Although flowchart 900 shows process blocks 940 and 950 as distinct, the calculation and rendering can be performed together; for example, the coordinate of the $i^{th}$ section marker can be calculated and the $i^{th}$ section marker rendered, before computing the coordinate of the $i+1^{th}$ marker.

Finally, an end marker can be rendered at optional process block 960.

In some examples, the indicia are features such as boundaries between adjacent segments rendered in different styles, such as for bar 1220 described below. For such examples, process blocks 950 and 960 can be replaced as follows. In place of process block 950, each $i^{th}$ segment can be rendered from $C(i)$ to $C(i+1)$. In place of process block 960, the last segment can be rendered from the last $C(i)$ value to the end of the bar UI element at P0+P.

A similar method is applicable for bar UI elements that are curvilinear, or not orthogonally aligned to the pixel grid. In such examples, a coordinate can be defined along the directional extent of the bar UI element, with P0 being the starting value of this coordinate at the beginning of the bar UI element, and P0+P the ending value of this coordinate. Then, the above procedure yields $C(i)$ that are coordinate values along the bar, rather than pixel coordinates, and the $C(i)$ values can be transformed to pixel coordinates according to the geometry of the bar UI element.

Example Launching of a GUI Architecture.

Figure 10:
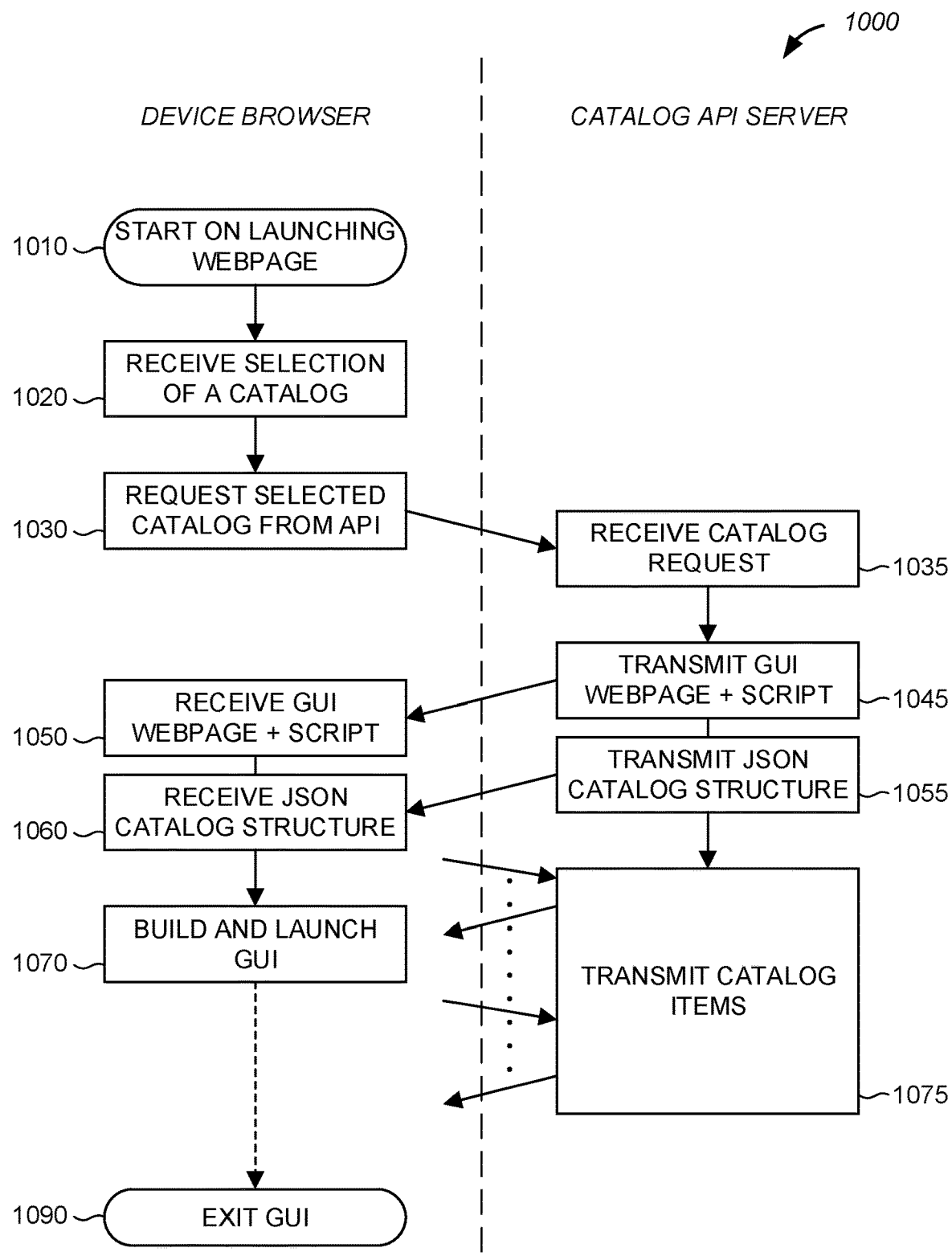
FIG. 10 is a flowchart of a method for launching a GUI architecture according to disclosed technologies.

FIG. 10 is a flowchart 1000 of a method for launching a GUI architecture according to disclosed technologies. Flowchart 1000 is depicted with swim lanes for a device browser and a catalog API server, however these particular actors are not required. In examples, other client-server architectures can be used. Some actions can be performed in a cloud environment, or through a content distribution network (CDN).

The method commences at process block 1010, with a launching webpage loaded onto a client browser. A launching webpage could be a home page, product page, or catalog page for a manufacturer, retailer, brand-owner, sales channel affiliate, or purveyor, owner, or publisher of a catalog or collection of images or other items. A launching webpage could be another webpage on which a catalog link is listed as an item or within an advertisement.

At process block 1020, a selection of a catalog is received at the device browser. The selection can be for an entire catalog, a partial catalog structure (such as "Women's clothing"), and can reflect other filtering (all "red" clothes) or a database query (all clothes branded "Banana Republic"™ and available in size 12). At process block 1030, the selected catalog is requested from a server.

At process block 1035, a catalog API server (which can be a primary server, a mirror, an edge server, or CDN) receives the catalog request from the requesting client. At process block 1040, a GUI webpage according to the disclosed technologies is transmitted to the requesting device. The GUI webpage can include both graphic elements of the GUI, and active script for executing functions as disclosed herein. In examples, process block 1045 can be omitted if client device has the GUI already cached. The transmitted GUI is received by the requesting client at process block 1050

At process block 1055, a catalog structure is transmitted to the requesting client, and received at process block 1060. The catalog structure can incorporate a data structure including one or more of: sections into which the catalog is organized, identifiers or attributes of items of the catalog (such as serial number, product code, product description, availability, sizes, or colors), links to catalog images, and/or off-catalog links (such a dedicated page for an item). In examples, the catalog structure can be a JSON structure, but other structures can be used.

After process block 1060, the requesting device possesses the GUI webpage, any required scripts, and the catalog structure, allowing the GUI to be built and launched at process block 1070. In examples, building and launching the GUI can include rendering of the bar UI element and/or the navigation wheel UI element described herein.

At process block 1075, catalog items are transmitted to the requesting client. In examples, process block 1075 can follow directly from process block 1055, or can proceed by request from the device browser, or by a combination. For example, a catalog API server can proceed to transmit low-resolution or thumbnail images of catalog items to the client device without receiving an explicit request, but can wait to receive explicit client requests before transmitting high-resolution images. In this way, bandwidth can be conserved and utilized dynamically according to a user's navigation pattern. For example, if a user jumps to section #4 and starts navigating forward, the GUI can request high-resolution images for section #4, and these can be delivered promptly without making the user wait until all content for sections #1-3 have been downloaded. In examples, high-resolution images can be requested and downloaded both forward and backward from the current position to provide responsiveness regardless of which direction a user operates the navigation wheel. In some examples, high-resolution images that have been cached need not be downloaded again; in other examples, the catalog and/or individual sections or items can be updated during a GUI session. In examples, process block 1075 can occupy an extended time interval, optionally including portions before the GUI is launched, portions during the launch of the GUI, and portions after the GUI has been launched.

The description above is based on a request at process block 1030. In other examples, process blocks 1010-1035 can be omitted, and the catalog GUI can be pushed to clients such as kiosks or catalog subscribers.

Although process blocks 1030-1035, 1035-1040, and 1045-1050 are shown directly connected, each of these connections can follow paths of varying complexity, with intermediate processing of the request at different protocol layers. Intermediate processing can include determining which server should respond to the request, applying any filtering or query in the request, determining caching status of the client device, determining which catalog version should be sent to the client, routing the request from an advertiser network to the catalog host, or merging advertisement content with the requested catalog.

Additional Exemplary Features.

The wheel UI element.

The wheel UI element 170 of FIG. 1A has the general appearance of a horizontal rectangle-like shape on which indicia 171 are rendered to give the appearance of a structured object and distinguish from text boxes, toolbars, or other rectangular UI elements. The indicia can also serve to represent the curvature of a wheel positioned in a plane perpendicular to the display, or to indicate motion of the wheel. In FIG. 1A, the wheel indicia 171 are shaded darker near the center of the wheel to denote proximity to a user, and are shaded progressively fainter towards the right or left ends of the wheel UI element to indicate curvature receding away from the user.

However, many other variations of wheel UI elements are within scope of the disclosed technologies. FIGS. 11A-11E illustrate some wheel variations; with this disclosure in hand, one of ordinary skill will appreciate that many further variations can be readily implemented within the scope of disclosed technologies.

Figure 11A:
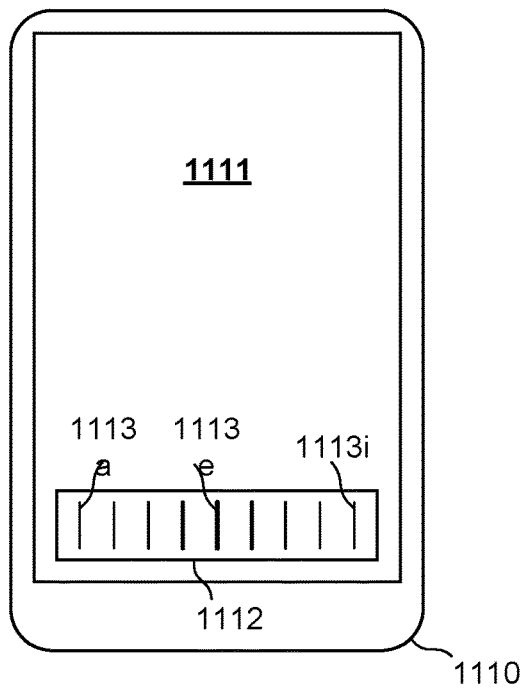
FIGS. 11A-11E illustrate variations of a wheel UI element, according to various embodiments of the present disclosure.
Figure 11B:
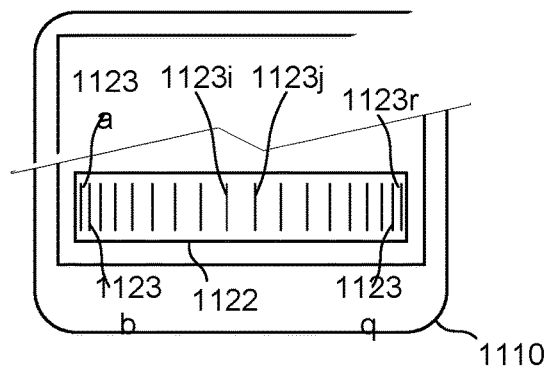
Figure 11C:
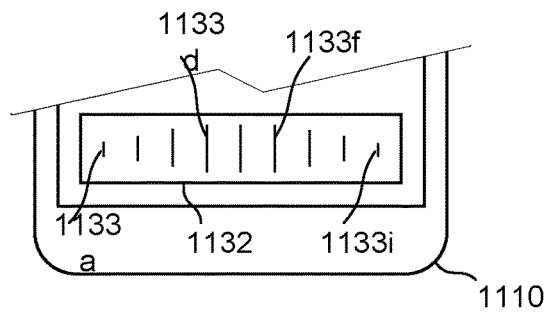

FIGS. 11A-11C illustrate a few different techniques for representing the curvature of the wheel UI element. In FIG. 11A, wheel UI element 1112 is depicted in an active display area 1111 of a device 1110. Indicia 1113a-i are distinguished by having varying thickness. Indicia 1113e in the center has the widest linewidth, with linewidth progressively decreasing towards the ends of the wheel UI element 1112, and indicia 1113a and 1113i having the narrowest linewidth. Thus, indicia 1113e appears to be towards the front, and indicia 1113a, 1113i appear to be towards the rear, indicating a wheel in a plane perpendicular to the display plane.

FIG. 11B depicts another example wheel UI element 1122. In this example, indicia 1123a-1123r have similar appearance but variable spacing. At the center, indicia 1123i-j are spaced farthest apart, and the spacing between neighboring indicia progressively decreases towards the ends of the wheel UI element 1122. Indicia 1123a-b and 1123q-r have the closest spacing. Thus, the ends of wheel UI element 1122 appear to be curving away from a viewer, connoting a wheel in a plane perpendicular to the display plane.

FIG. 11C depicts another example wheel UI element 1132. In this example, indicia 1133a-1133i have similar thickness, shading, and are uniformly spaced, but have varying heights. At the center, indicia 1133d-f are the tallest, and the heights of indicia progressively decrease towards the ends of the wheel UI element 1132. Indicia 1133a and 1133i are the shortest. Thus, the ends of wheel UI element 1132 appear to be farther from a viewer than the center of wheel UI element 1132, representing a wheel in a plane perpendicular to the display plane.

Figure 11D:
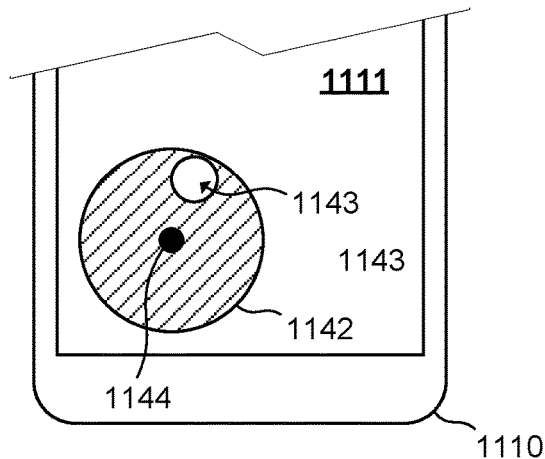
Figure 11E:
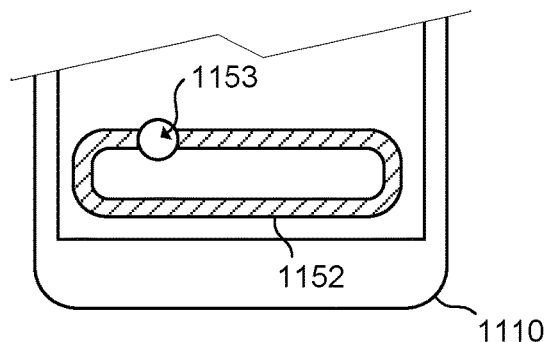

The above examples depict wheels seen edge-on (that is, so the face of the wheel is not visible), but this is not a requirement. FIGS. 11D-11E illustrate wheel UI elements in the display plane and within the display area 1111 of device 1110. In FIG. 11D, wheel UI element 1142 has a round shape characteristic of a wheel, and is operable to be rotated by grabbing a grab point 1143 and dragging the grab point 1143 about axis 1144. In some examples, the wheel is only operable by selecting grab point 1143, while in other embodiments any point on the wheel 1142 can serve to grab and operate the wheel element 1142. In examples, zero, one, two, 3-5, 6-12, or even more grab points or similar indicia can be rendered on or alongside wheel UI element 1142. In examples, only an arc of the wheel can be rendered within the display area, with the rest of the wheel indicated to be outside the active display area or occluded by other UI elements of the GUI. In further examples, the interior portion of wheel UI element 1142 can be utilized to render status indicators, text boxes associated with an image catalog or a presently displayed image, thumbnail previews, or even the mail image tableau. In examples, the wheel can be rendered as a polygon, a gear, a picture image, or one or more hands of a clock. In other examples, the wheel can be rendered with shading to represent a sphere or sphere-like object, and can be operable to be dragged and spun in any three-dimensional way. In still further examples, a wheel can be rendered at an oblique angle.

FIG. 11E illustrates wheel UI element 1152 which has the appearance of a racetrack, with a grab point 1153 operable to be dragged around the racetrack. Similar to FIG. 11D, all or part of racetrack 1152 can be operable as a grab point. Zero, one, two, 3-5, 6-12, or even more grab points or similar indicia can be rendered on or alongside wheel UI element 1152. The wheel UI element 1152 has been illustrated as occupying a similar portion of the active display area as the wheel UI elements 1112, 1122, 1132, but this is not a requirement. In other examples, racetrack 1152 can be smaller or larger, and can form a loop near the periphery of the active display area, or around a smaller region, with a few, some, or all of the remaining UI elements rendered inside the racetrack 1152. In examples, a plurality of grab points 1153 can be independently operable for different functions on racetrack 1152, or on different racetracks. A racetrack wheel can offer two, five, six, or more times the useful dynamic range as an edge-on wheel as in FIGS. 11A-11C, with a span of up to 20, up to 50, up to 100, up to 200, or more images in a single controlled swipe or drag motion.

While some examples of the disclosed technologies operate with swipe or dragging input gestures on a wheel UI element, this is not a requirement of the disclosed technologies. In examples, wheel UI elements can be operated by taps, by events from a pointing device such as a trackball or mouse, by other gestures, or by audible inputs. Wheels can also be sensitive to the position of an input, for example an input near the end of a wheel can result in a larger traversal than an input near the center of the wheel. In examples, a wheel UI element can be user-configurable, including visual and operational features of the wheel, such as style, directional sense, input modes, appearance, or audio, visual, haptic, or other special effects.

The bar UI Element.

The bar UI element 110 of FIG. 1 has the general appearance of a linear vertical shape on which indicia 130 are rendered to indicate sections of a collection being displayed. In FIG. 1A, bar UI element 110 is shown in an indicator mode, or a position indicating mode, in which a marker or other feature shows a current position of a currently displayed item, relative to the sections. In FIG. 1A, bar UI element 110 has a different color above and below the current position; the boundary between different colors is a feature 160 indicating the current position, not unlike a mercury or alcohol thermometer in which the end of the thermometric fluid column indicates the current temperature. Bar UI element 110 can also be seen to represent progress of a user's traversal through an image catalog.

However, many other variations of bar UI elements are within scope of the disclosed technologies. For example, the color change of a bar during traversal can be limited to portions of a catalog that have been viewed. Viewing part of section #1, followed by a jump to section #4 and viewing the entirety of section #4 could result in a change of color of the viewed portion of section #1 and all of section #4, with unviewed portions of sections #1-3 retaining an unmodified base color.

FIGS. 12A-12E illustrate some more bar variations; with this disclosure in hand, one of ordinary skill will appreciate that many further variations can be readily implemented.

Figure 12A:
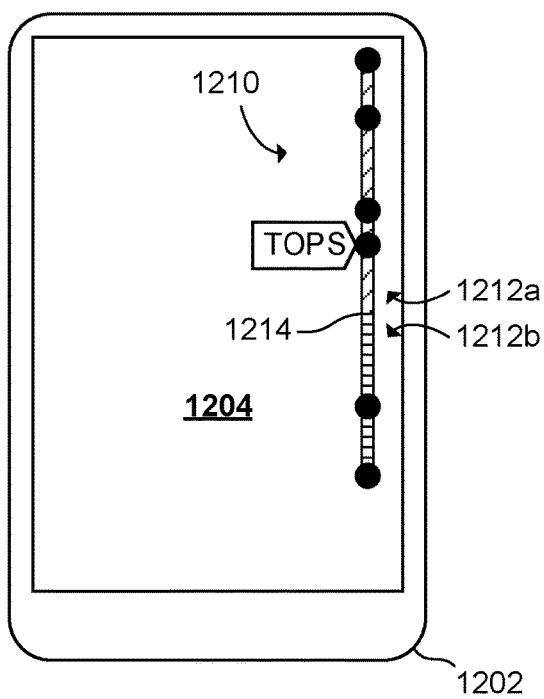
Figure 12D:
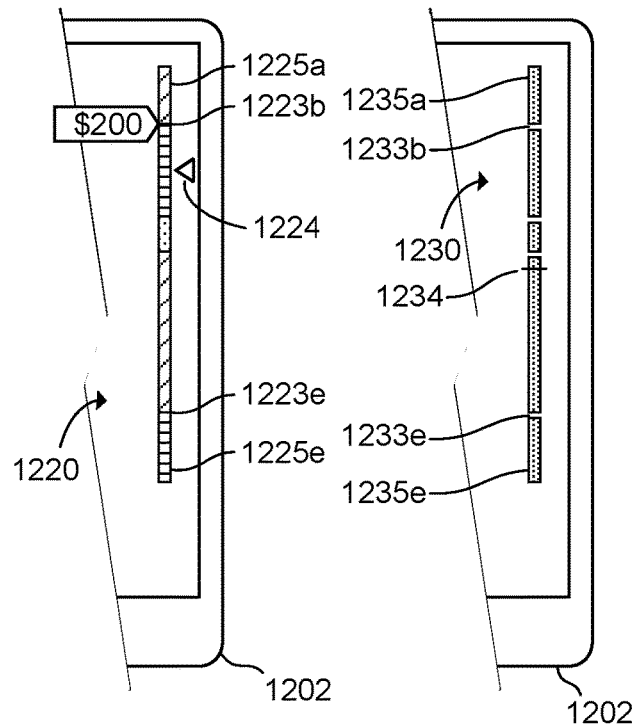
Figure 12D:
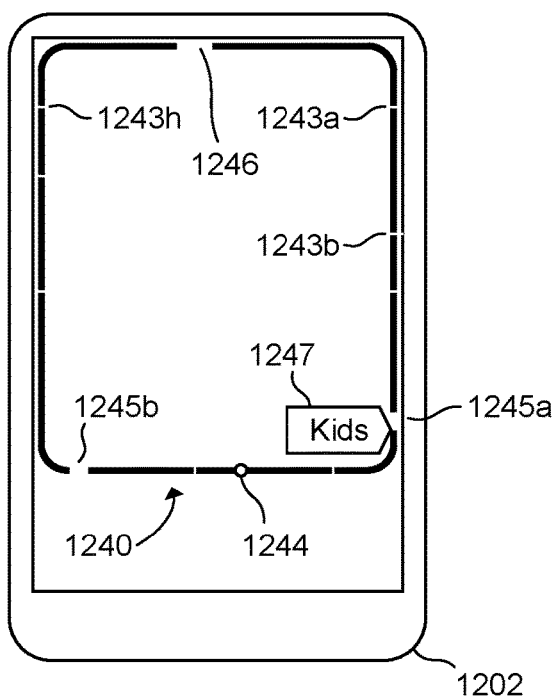
Figure 12E:
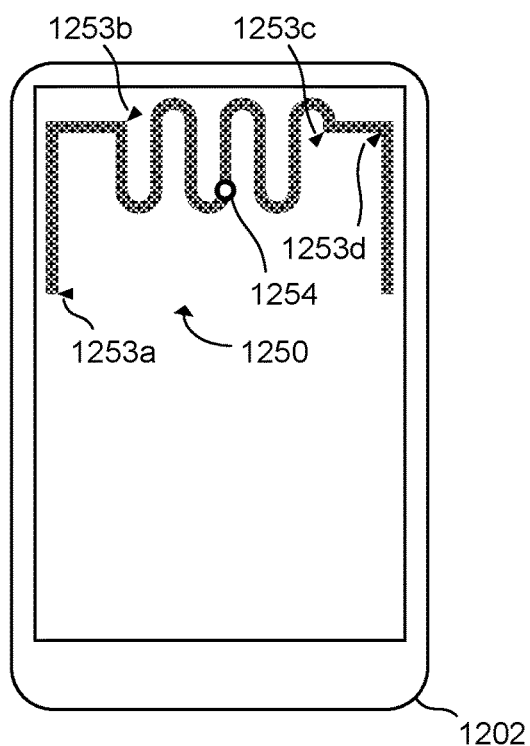

The sectional divisions of a bar into segments can be represented in a multitude of ways. In FIG. 12B, bar 1220 is composed of sections 1225*a-e*, which are rendered in a repeating sequence of two or more colors. Thus each contiguous colored segment represents one section of a displayed catalog or collection, and the boundaries 1223*b-e* between segments are features or indicia demarcating sectional divisions. In FIG. 12C, the segments 1235*a-e* are shown in a same color, but are separated by short gaps 1233*b-e* to mark the sectional divisions. FIG. 12D also uses gaps between segments. Short gaps, 1243*a-h* show gaps between sections, while larger gaps 1245*a-b* can be used to designate divisions between different groups of sections. The largest gap 1246 depicts a break between a start and an end of a catalog. For example, a first group can correspond to women's clothing, while a second group can correspond to children's clothing as indicated by label 1247 ("Kids"). FIG. 12E shows external markers 1253*a-d* to indicate section divisions.

As discussed herein, a bar UI element need not be in the form of a straight line. FIG. 12D depicts bar 1240 in a racetrack configuration, which can be open or closed. In FIG. 12E, a curved or serpentine section between markers 1253*b-c* is used where one section has many more catalog items than other catalog sections. Furthermore, bar 1250 is folded at corners. As shown, corners of bar 1252 can be section breaks, but need not be section breaks.

In examples, a bar UI element can be user-configurable, including visual and operational features of the bar, such as style, directional sense, input mode, appearance, or audio, visual, haptic, or other special effects.

The Bar in Position Indicating Mode.

In position indicating mode, the current position can be indicated in numerous ways. FIG. 12A depicts a bar 1210 within active display region 1211 of a device 1210. The bar is rendered as an upper segment 1212*a* and a lower segment 1212*b*, which are visually distinguishable by being different colors as shown, or by having different shading, or by having different widths; the boundary 1214 between regions 1212*a*, 1212*b* is a feature indicating the current position. In FIG. 12B, marker 1224 alongside bar 1220 indicates the current position, while in FIG. 12C, marker 1234 is overlaid on the bar 1230. In examples, markers can be pointers, arrows, lines, circles, ovals, polygons, other closed shapes, other open shapes, other filled shapes, or other shape outlines. In FIG. 12D, marker 1244 is a circle matching the color of bar 1240, with a differently colored interior. Marker 1254 in FIG. 12E is similar.

The Bar in Navigation Mode.

Figure 13A:
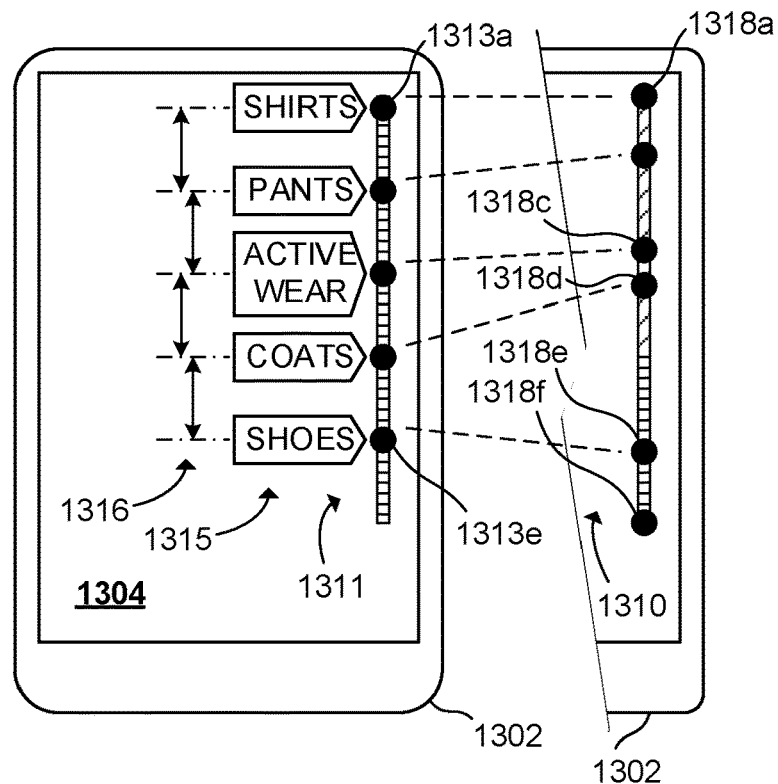
Figure 13A:
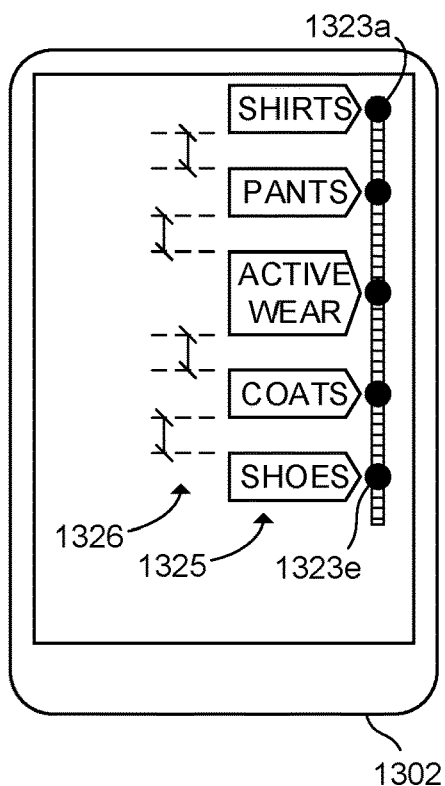
Figure 13A:
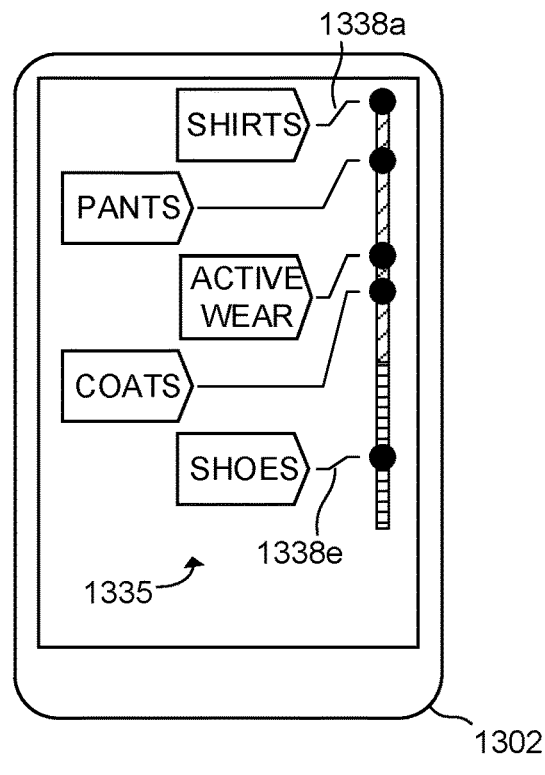

In navigation mode, the section labels can be indicated in numerous ways. The left side of FIG. 13A depicts a navigation mode bar 1311 within active display region 1304 of a device 1302, which corresponds to position indicating mode bar 1310 on the right-hand side of FIG. 13A. Rendered on and alongside navigation bar 1311 are section markers 1313*a-e* and labels 1315. Labels 1315 are equally spaced. As indicated by the dimension lines 1316, the centerlines of successive labels 1315 are equidistant from one another. FIG. 13B shows another illustration of labels 1325, which are also equally spaced. As indicated by dimension lines 1326, the gaps between successive labels 1325 are equally sized. As used in this disclosure, the expression "equally spaced" means that the distance from a feature of one item to a corresponding feature of a next item is the same for successive pairs of items. Here, distance is a non-zero distance in at least one dimension. Thus, the expression "equally spaced" is applicable to the section labels of both FIGS. 13A-13B.

Both FIGS. 13A-13B show section markers 1313, 1323 aligned with respective labels, however this is not a requirement for the disclosed technologies, nor for equally spaced labels. FIG. 13C depicts a configuration in which equally spaced section labels 1335 are associated with section markers using lead lines 1338*a-e*. In this configuration, the section markers can retain spacing proportional to section size, and do not need to move during transformation between position indicating mode and navigation mode.

Transformation of the Bar Between Modes.

As described herein and shown on the right-hand side of FIG. 13A, in position indicating mode, section markers 1318*a-f* can be positioned according to size of respective sections. Whereas the left-hand side of FIG. 13A shows equally spaced section markers 1313a-e in navigation mode. In examples, one attribute of the bar transformation is a smooth or continuous motion of section markers 1318a⇌1313a . . . 1318e⇌1313e. This motion can be performed on an equal time basis, so that 1318d moves faster than 1318c, because 1318d has farther to go. The motion can be performed on an equal speed basis, in which case 1318d takes longer to reach its destination than 1318c. The smooth motion can be performed at constant speed, or it can be performed with a smooth acceleration and/or deceleration profile. The smooth motion can be performed with distortion of the section markers, animation, or other special effects.

Other aspects of the bar transformation include a change in appearance of the bar itself, the appearance/disappearance of labels and lead lines, and the disappearance of an extra section marker 1318f in position indicating mode—because there is no corresponding label at the end of the catalog, there is no need for a section marker at the end of the catalog in navigation mode. All of these transformation aspects can be done suddenly, or smoothly with fade-in/fade-out, translation, distortion, animation, or other special effects. In some examples, labels can fade-in at their designated position, while in other examples, labels can fade-in alongside their corresponding moving section markers during a transformation. In further examples, section labels can be slid in from one or more edges of the display. Removal of labels offers a similar variety of choices. In some examples, transformations of GUI elements can be implemented using CSS (cascading style sheets) functionality. Extensions or variants of CSS such as Less, Sass, and Stylus can also be used.

A Generalized Computer Environment.

Figure 14:
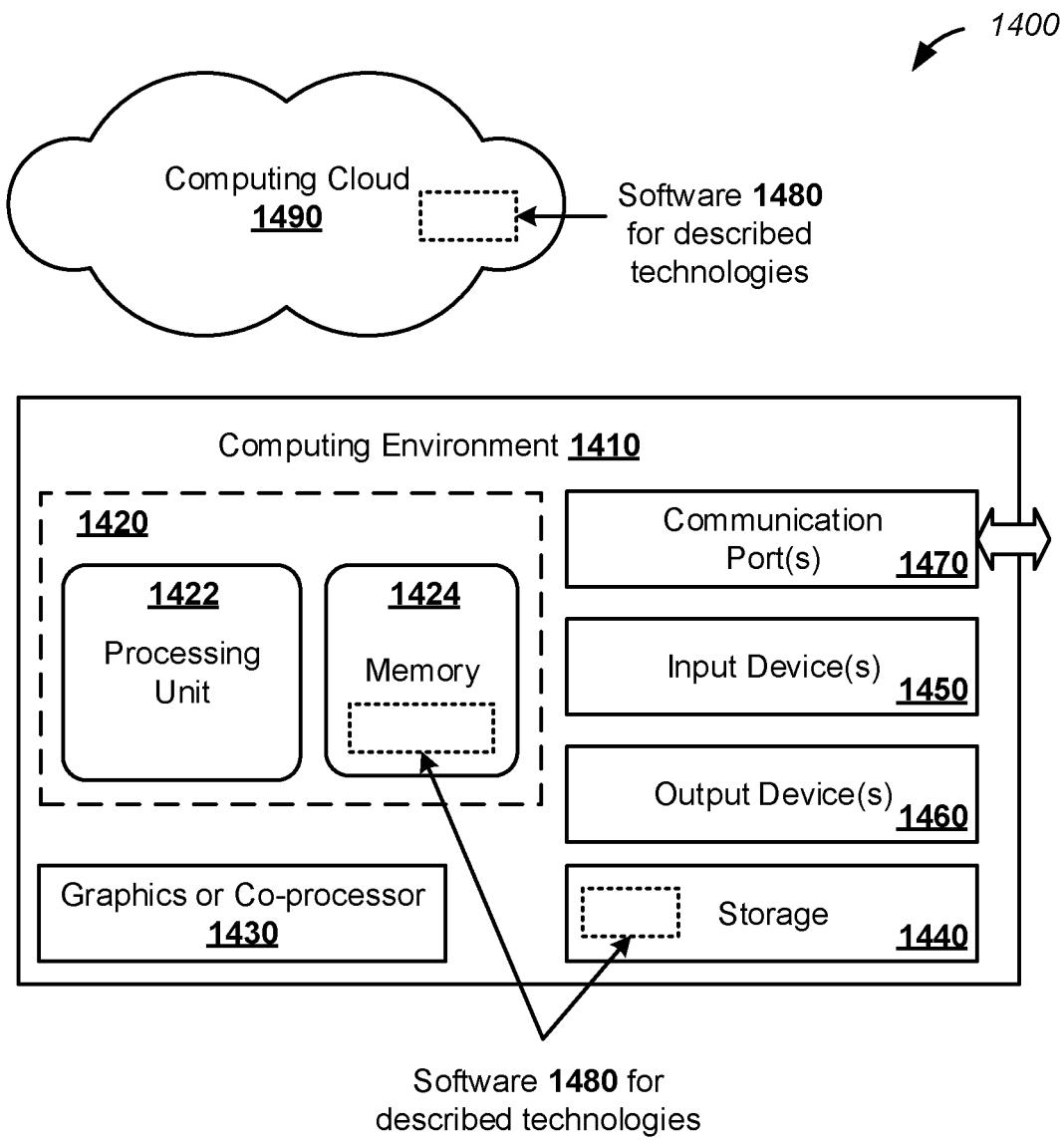
FIG. 14 is a diagram schematically depicting a computing environment suitable for implementation of disclosed technologies, according to various embodiments of the present disclosure.

FIG. 14 illustrates a generalized example of a suitable computing system 1400 in which described examples, techniques, and technologies, including construction, deployment, operation, and maintenance of a lock mode determination service, can be implemented. The computing system 1400 is not intended to suggest any limitation as to scope of use or functionality of the present disclosure, as the innovations can be implemented in diverse general-purpose or special-purpose computing systems.

With reference to FIG. 14, computing environment 1410 includes one or more processing units 1422 and memory 1424. In FIG. 14, this basic configuration 1420 is included within a dashed line. Processing unit 1422 executes computer-executable instructions, such as for implementing components of GUI architecture 700 (e.g., image manager 720, navigation module 730, wheel module 740, bar module 750), any of the methods described herein, or various other architectures, components, handlers, managers, modules, and repositories described herein. Processing unit 1422 can be a general-purpose central processing unit (CPU), processor in an application-specific integrated circuit (ASIC), or any other type of processor. In a multi-processing system, multiple processing units execute computer-executable instructions to increase processing power. Computing environment 1410 can also include a graphics processing unit or co-processing unit 1430. Tangible memory 1424 can be volatile memory (e.g., registers, cache, or RAM), non-volatile memory (e.g., ROM, EEPROM, or flash memory), or some combination thereof, accessible by processing units 1422, 1430. The memory 1424 stores software 1480 implementing one or more innovations described herein, in the form of computer-executable instructions suitable for execution by the processing unit(s) 1422, 1430. The memory 1424 can also store database data, including some or all of image library 722. The memory 1424 can also store some or all of a catalog structure, display buffer 760, and/or other configuration and operational data.

A computing system 1410 can have additional features, such as one or more of storage 1440, input devices 1450, output devices 1460, or communication ports 1470. An interconnection mechanism (not shown) such as a bus, controller, or network interconnects the components of the computing environment 1410. Typically, operating system software (not shown) provides an operating environment for other software executing in the computing environment 1410, and coordinates activities of the components of the computing environment 1410.

The tangible storage 1440 can be removable or non-removable, and includes magnetic disks, magnetic tapes or cassettes, CD-ROMs, DVDs, or any other medium which can be used to store information in a non-transitory way and which can be accessed within the computing environment 1410. The storage 1440 stores instructions of the software 1480 (including instructions and/or data) implementing one or more innovations described herein.

The input device(s) 1450 can be a mechanical, touch-sensing, or proximity-sensing input device such as a keyboard, mouse, pen, touchscreen, or trackball, a voice input device, a scanning device, or another device that provides input to the computing environment 1410. The output device(s) 1460 can be a display, printer, speaker, optical disk writer, or another device that provides output from the computing environment 1410.

The communication port(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1400 can also include a computing cloud 1490 in which instructions implementing all or a portion of the disclosed technology are executed. Any combination of memory 1424, storage 1440, and computing cloud 1490 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

Figure 16:
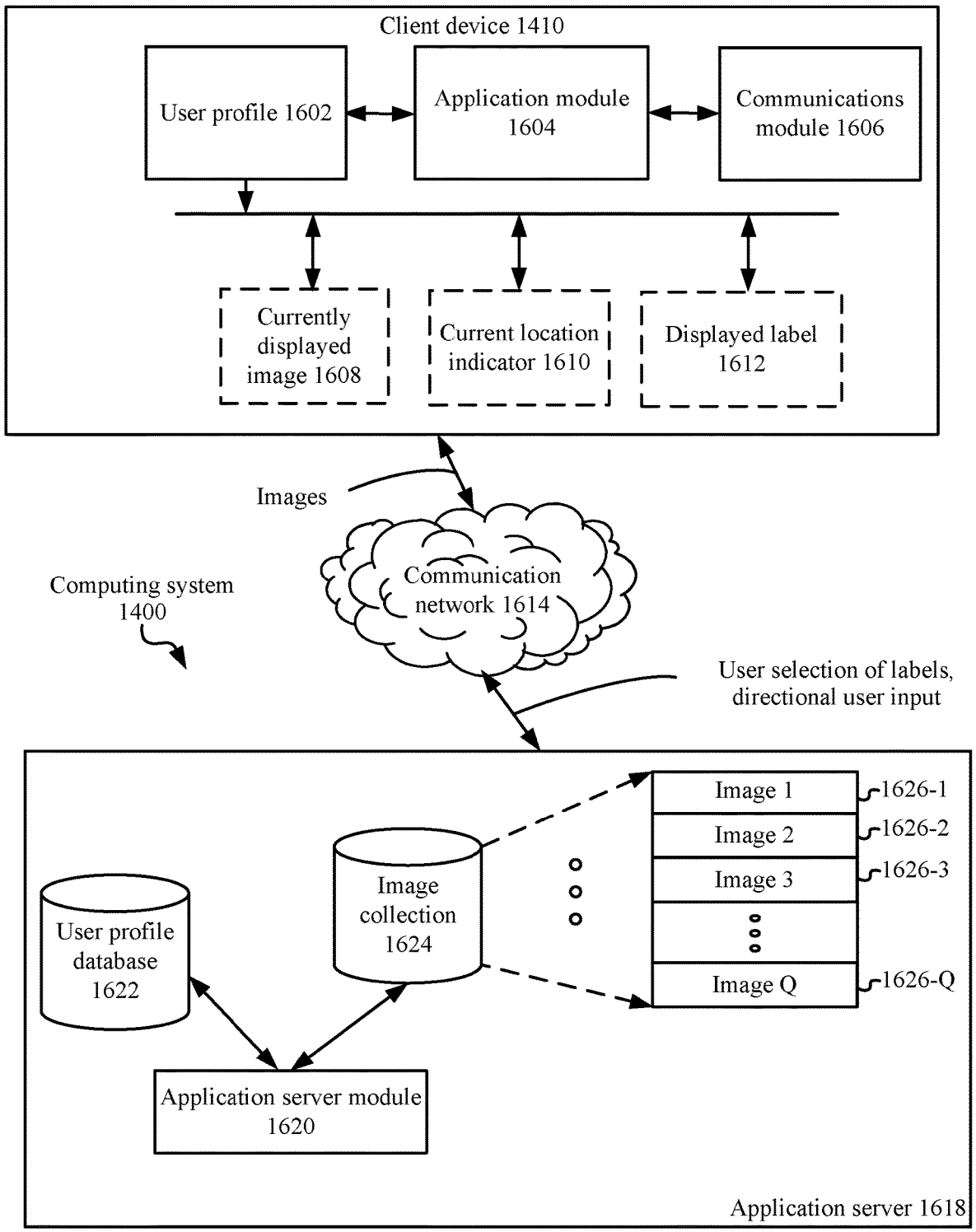
FIG. 16 is an example block diagram illustrating a computing system, in accordance with some implementations of the present disclosure.
Figure 17:
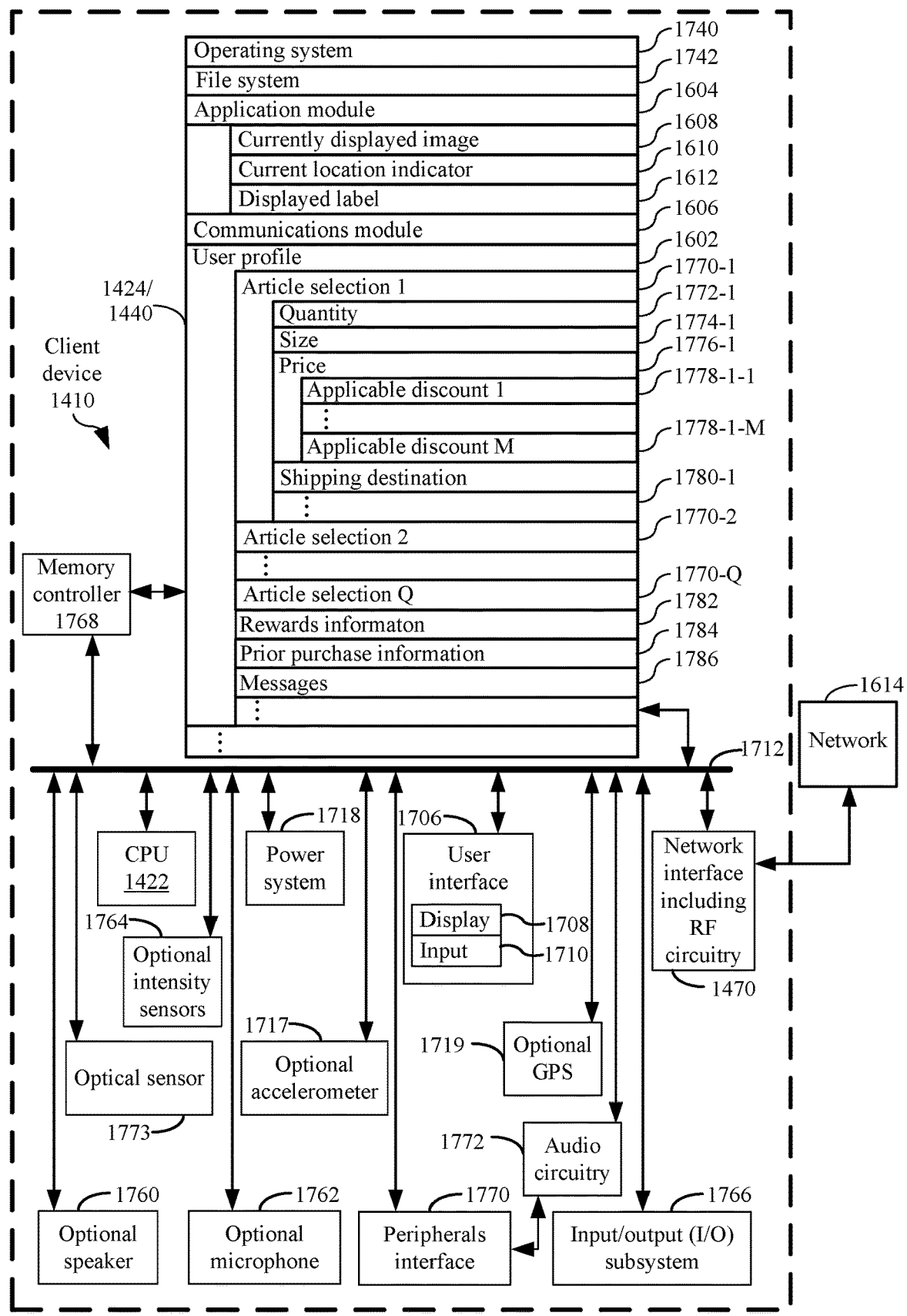
FIG. 17 is an example block diagram illustrating a client computing device, in accordance with some implementations of the present disclosure.
Figure 18:
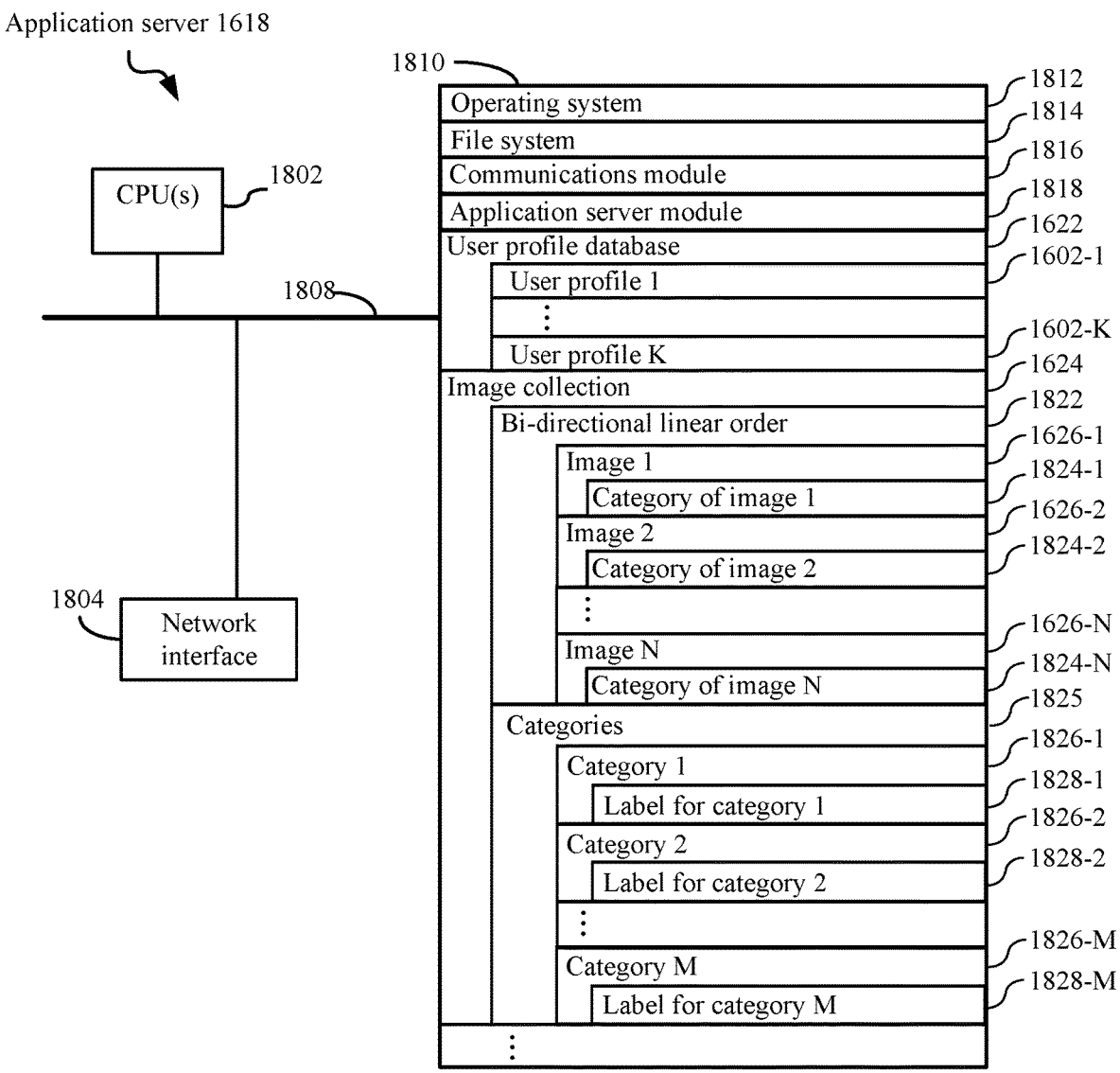
FIG. 18 is an example block diagram illustrating an application server, in accordance with some implementations of the present disclosure.

FIGS. 16 through 18 illustrate an example computing system 1400 in accordance with FIG. 14. In particular, FIG. 16 is a block diagram illustrating a computing system 1400, in accordance with some implementations. In some implementations, the computing system 1400 includes one or more computing devices 1410 (e.g., computing devices 1410A, 1410B, 1410C, 1410D . . . , and 1410N), a communication network 1614, and one or more application server systems 1618. In some implementations, a computing device 1410 is a phone (mobile or landline, smart phone or otherwise), a tablet, a computer (mobile or otherwise), a hands free computing device, or an electronic device with a touch-sensitive surface. In some embodiments, a computing device 1410 is any device having a touch screen display. In some embodiments, a computing device 1410 is any device having a display that will detect a location of a stylus. In some embodiments, a computing device 1410 is any device that is in electronic communication and responsive to an electronic pointing device such as a track ball or a mouse.

Referring to FIG. 16, in some implementations, the computing device 1410 includes an application module 1640 that facilitates the graphical user interfaces disclosed herein. In some implementations, the computing device 1410 also includes a user profile 1602. The user profile 1602 stores information regarding purchases the user is about to make or has made in the past. In some implementations, the computing device 1410 also includes a communications module 1606. The communications module 1606 is used to communicate with application server 1618, for instance, to obtain images, communicate the selection of labels, or communicate directional user input. As used herein, the terms "images" and "pictures" is used interchangeably.

In some implementations, the communication network 1614 interconnects one or more computing devices 1410 with the application server system 1618. In some implementations, the communication network 1614 optionally includes the Internet, one or more local area networks (LANs), one or more wide area networks (WANs), other types of networks, or a combination of such networks.

In some implementations, the application server system 1618 includes an application server module 1620, a user profile database 1622, and an image collection 1624 comprising a plurality of images 1626. In some embodiments, the application server module 1618, through the application module 1640, provides users with an image catalog comprising images 1626 from the image collection 1624.

In some embodiments, application server module 1620 maintains a profile in the user profile database 1622 of each user that access the image collection 1624 through a computing device 1410. In some embodiments, there are hundreds, thousands, tens of thousands or more users of the application module 1604 on corresponding computing devices 1410 and the application server module 1620 stores a profile for each such user in user profile database 1622. In some embodiments, the user profile database 1622 does not store an actual identity of such users, but rather a simple login and password. In some embodiments, the profiles in the user profile database 1622 are limited to the logins and passwords of users. In some embodiments, the profiles in user profile database 1622 comprises user logins, passwords, and information regarding purchases users have made and/or have selected for purchase. In some embodiments, the user profile in the user profile database 1622 includes a limited amount of information whereas a user profile 1602 on a computing device 1410 associated with the user contains more information. For example, in some embodiments, the user profile in user profile database 1622 includes user login and password whereas the user profile 1602 on the computing device 1410 for the same user includes credit card information associated with the user. It will be appreciated that any possible variation of this is possible, with the profile for the user in user profile database 1622 including all or any subset of the data associated with the user and the user profile 1602 for the user on the corresponding computing device 1410 including all or any subset of the data associated with the user. In some embodiments, there is no user profile 1602 stored on computing device 1410 and the only profile for the user is stored on application server 1618 in user profile database 1622.

FIG. 17 is an example block diagram illustrating a computing device 102, in accordance with some implementations of the present disclosure. It has one or more processing units (CPUs) 1422, peripherals interface 1770, memory controller 1768, a network or other communications interface 1470, a memory 1424/1440 (e.g., random access memory), a user interface 1706, the user interface 1706 including a display 1708 and input 1710 (e.g., keyboard, keypad, touch screen, mouse, track ball), an optional accelerometer 1717, optional audio circuitry 1772, an optional speaker and/or audio jack 1760, an optional microphone 1762, one or more optional intensity sensors 1764 for detecting intensity of contacts on the device 1410 (e.g., a touch-sensitive surface such as a touch-sensitive display system 1708 of the device 1410), optional input/output (I/O) subsystem 1766, one or more optional optical sensors 1773, one or more communication busses 1712 for interconnecting the aforementioned components, and a power system 1718 for powering the aforementioned components.

In typical embodiments, the input 1710 is a touch-sensitive display, such as a touch-sensitive surface. In some embodiments, the user interface 1706 includes one or more soft keyboard embodiments. The soft keyboard embodiments may include standard (QWERTY) and/or non-standard configurations of symbols on the displayed icons.

Device 1410 optionally includes, in addition to accelerometer(s) 1717, a magnetometer (not shown) and a GPS 1719 (or GLONASS or other global navigation system) receiver for obtaining information concerning the coordinates and orientation (e.g., portrait or landscape) of device 1424.

It should be appreciated that device 1424 is only one example of a multifunction device that may be used, and that device 1424 optionally has more or fewer components than shown, optionally combines two or more components, or optionally has a different configuration or arrangement of the components. The various components shown in FIG. 17 are implemented in hardware, software, firmware, or a combination thereof, including one or more signal processing and/or application specific integrated circuits.

Memory 1424/1440 optionally includes high-speed random access memory and optionally also includes non-volatile memory, such as one or more magnetic disk storage devices, flash memory devices, or other non-volatile solid-state memory devices. Access to memory 1424/1440 by other components of device 1410, such as CPU(s) 1422 is, optionally, controlled by memory controller 1768.

Peripherals interface 1770 can be used to couple input and output peripherals of the device to CPU(s) 1422 and memory 1424/1440. The one or more processors 1422 run or execute various software programs and/or sets of instructions stored in memory 1424/1440 to perform various functions for device 1410 and to process data.

In some embodiments, peripherals interface 1770, CPU(s) 1424/1440, and memory controller 1768 are, optionally, implemented on a single chip. In some other embodiments, they are, optionally, implemented on separate chips.

In some embodiments, RF (radio frequency) circuitry of the network interface 1470 receives and sends RF signals, also called electromagnetic signals. RF circuitry 1470 converts electrical signals to/from electromagnetic signals and communicates with communications networks and other communications devices via the electromagnetic signals. RF circuitry 1470 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1470 optionally communicates with networks 1614. In some embodiments, circuitry 1470 does not include RF circuitry and, in fact, is connected to network 1614 through one or more hard wires (e.g., an optical cable, a coaxial cable, or the like).

Examples of networks 1614 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document. In some embodiments, the network 1614 is a wired network. In some embodiments, the network 1614 is a wireless network. In some embodiments, the network 1614 is a combination of a wireless and a wired network.

In some embodiments, audio circuitry 1772, speaker 1760, and microphone 1762 provide an audio interface between a subject (user of application module 1604) and device 1410. The audio circuitry 1772 receives audio data from peripherals interface 1770, converts the audio data to one or more electrical signals, and transmits the one or more electrical signals to speaker 1760. Speaker 1760 converts the one or more electrical signals to human-audible sound waves. Audio circuitry 1772 also receives electrical signals converted by microphone 1762 from sound waves. Audio circuitry 1772 converts the electrical signal to audio data and transmits the audio data to peripherals interface 1770 for processing. Audio data is, optionally, retrieved from and/or transmitted to memory 1424/1440 and/or RF circuitry 1470 by peripherals interface 1770.

In some embodiments, power system 1718 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the device 1410 optionally also includes one or more optical sensors 1773. Optical sensor(s) 1773 optionally include charge-coupled device (CCD) or complementary metal-oxide semiconductor (CMOS) phototransistors. Optical sensor(s) 1773 receive light from the environment, projected through one or more lens, and converts the light to data representing an image. Optical sensor(s) 1773 optionally capture still images and/or video. In some embodiments, an optical sensor is located on the back of device 1410, opposite display system 1708 on the front of the device, so that the touch screen is enabled for use as a viewfinder for still and/or video image acquisition.

As illustrated in FIG. 17, a device 1410 preferably comprises an operating system 1740 (e.g., iOS, DARWIN, RTXC, LINUX, UNIX, OS X, WINDOWS, or an embedded operating system such as VxWorks), which includes various software components and/or drivers for controlling and managing general system tasks (e.g., memory management, storage device control, power management, etc.) and facilitates communication between various hardware and software components. The device further optionally comprises a file system 1742 which may be a component of operating system 1740, for managing files stored or accessed by the computing device 1410. Further still, the device 1740 further comprises an application module 1604 for viewing images of an image collection. In some embodiments, the device 1410 comprises a communications module (or instructions) 1606 for connecting the device 1410 with other devices (e.g., the application server 1618 via one or more network interfaces 14170 (wired or wireless), and/or the communication network 1614 (FIG. 16).

Further still, in some embodiments, the device 1410 comprises a user profile 1602. Exemplary user profiles 1602 comprise a description of one or more articles 1770, and for each such respective article 1770, the quantity 1772 of the respective article 1770 the user wishes to purchase, the size of the article the user wishes to purchase, the prices 1776 of the respective article 1770, any applicable discounts 1778 to the prices, and a shipping destination 1780 for the respective article. In some embodiments the user profile 1602 further comprises rewards information 1782 associated with the user, prior user purchase information 1784, and/or one or more messages 1786 for the user.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 1424/1440 optionally stores a subset of the modules and data structures identified above. Furthermore, the memory 1424/1440 may store additional modules and data structures not described above.

FIG. 18 is an example block diagram illustrating an application server 1618 in accordance with some implementations of the present disclosure. The application server 1618 typically includes one or more processing units CPU(s) 1802 (also referred to as processors), one or more network interfaces 1804, memory 1810, and one or more communication buses 1808 for interconnecting these components. The communication buses 1808 optionally include circuitry (sometimes called a chipset) that interconnects and controls communications between system components. The memory 1808 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 1808 optionally includes one or more storage devices remotely located from CPU(s) 1802. The memory 1810, or alternatively the non-volatile memory device(s) within the memory 1810, comprises a non-transitory computer readable storage medium. In some implementations, the memory 1810 or alternatively the non-transitory computer readable storage medium stores the following programs, modules and data structures, or a subset thereof:

- an operating system 1812, which includes procedures for handling various basic system services and for performing hardware dependent tasks;
- optionally, a file system 1814 which may be a component of operating system 1812, for managing files stored or accessed by the application server 1618;
- a network communication module (or instructions) 1816 for connecting the application server 1618 with other devices (e.g., the computing devices 1410) via the one or more network interfaces 1804 (wired or wireless), and/or the communication network 1614 (FIG. 16);
- an application server module 1818 for managing a plurality of instances of an application module 1604, each instance corresponding to a different participant (user of a device 1410) and for tracking user activities within such application 1604;
- a user profile database 1622 that optionally stores a user profile 1602 for each user of the application module 1604 (e.g., that is run on device 1410 of FIG. 16);
- an image collection 1624 that stores a plurality of images 1626 indexed as an ordered list that specifies a bi-directional linear order 1822 by which images 1626 in the plurality of images are to be displayed, and for each respective image 1626 a corresponding image category 1824; and
- a set of categories 1825, each respective category 1826 in the set of categories 1825 representing a subset of the images 1626 in the image collection 1624 and associated with a label 1828.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 1810 optionally stores a subset of the modules and data structures identified above. Furthermore, the memory 1810 may store additional modules and data structures not described above.

Although FIGS. 17 and 18 show a "client device 1410" and an "application server 1618," respectively, FIGS. 17 and 18 are intended more as functional description of the various features which may be present in computer systems than as a structural schematic of the implementations described herein. In practice, and as recognized by those of ordinary skill in the art, items shown separately could be combined and some items could be separated.

An Example Cloud Computing Environment.

Figure 15:
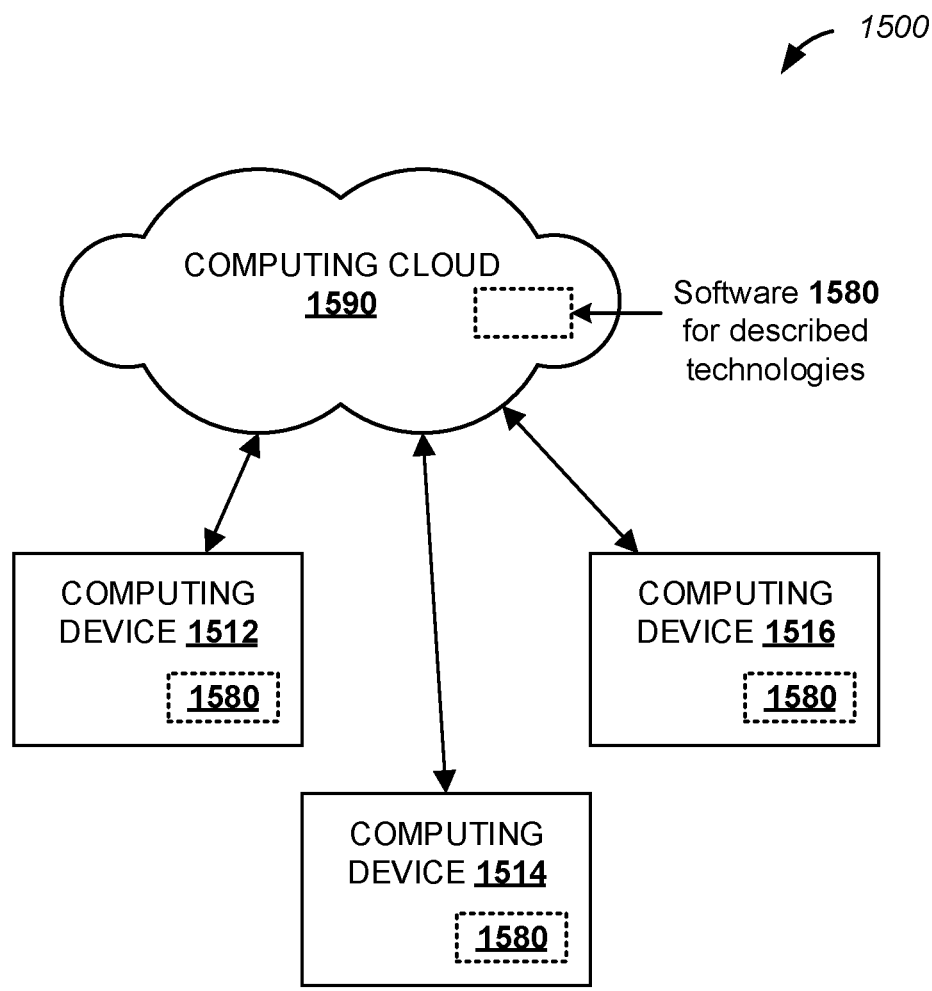
FIG. 15 is a diagram schematically depicting computing devices operating in conjunction with a computing cloud for implementation of disclosed technologies, according to various embodiments of the present disclosure.

FIG. 15 depicts an example cloud computing environment 1500 in which the described technologies can be implemented. The cloud computing environment 1500 comprises a computing cloud 1590 containing resources and providing services. The computing cloud 1590 can comprise various types of cloud computing resources, such as computer servers, data storage repositories, networking resources, and so forth. The computing cloud 1590 can be centrally located (e.g., provided by a data center of a business or organization) or distributed (e.g., provided by various computing resources located at different locations, such as different data centers and/or located in different cities or countries).

The computing cloud 1590 can be operatively connected to various types of computing devices (e.g., client computing devices), such as computing devices 1512, 1514, and 1516, and can provide a range of computing services thereto. One or more of computing devices 1512, 1514, and 1516 can be computers (e.g., server, virtual machine, embedded systems, desktop, or laptop computers), mobile devices (e.g., tablet computers, smartphones, or wearable appliances), or other types of computing devices. Connections between computing cloud 1590 and computing devices 1512, 1514, and 1516 can be over wired, wireless, or optical links, or any combination thereof, and can be short-lived or long-lasting. These connections can be stationary or can move over time, being implemented over varying paths and having varying attachment points at each end. Computing devices 1512, 1514, and 1516 can also be connected to each other.

Computing devices 1512, 1514, and 1516 can utilize the computing cloud 1590 to obtain computing services and perform computing operations (e.g., data processing, data storage, and the like). Particularly, software 1580 for performing the described innovative technologies can be resident or executed in the computing cloud 1590, in computing devices 1512, 1514, and 1516, or in a distributed combination of cloud and computing devices.

General Considerations.

As used in this disclosure, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "determine," "evaluate," and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1424, and storage 1440. The term computer-readable storage media does not include signals and carrier waves. In addition, the term computer-readable storage media does not include communication ports (e.g., 1470) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C #, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, using CSS, JSON, or any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing system comprising a touch-sensitive surface, one or more processors, and memory, the memory storing instructions for executing a method comprising:

accessing an image collection comprising a plurality of images indexed as an ordered data structure that specifies a bi-directional linear order by which images in the plurality of images are to be accessed, wherein the ordered data structure (i) arranges the plurality of images into a plurality of contiguous subsets of images and (ii) further specifies a first end image and a second end image from among the plurality of images, and wherein:

each respective contiguous subset of images in the plurality of contiguous subsets of images represents a different label in a plurality of labels;

including a first image from the image collection in a module rendered on the touch-sensitive surface based upon the bi-directional linear order, wherein a respective image rendered from the image collection consumes a first affordance region, and wherein a first centroid of the first affordance region defines a longitudinal axis and a transverse axis;

including a navigation wheel in the module persistently rendered on the touch-sensitive surface, wherein the navigation wheel consumes a second affordance region that is different from the first affordance region, the navigation wheel includes a first subset of indicia in a plurality of indicia, the first subset of indicia indicative of a curative of the navigation wheel, and wherein a second centroid of the second affordance region intersects the longitudinal axis of the first affordance region;
  including a bar UI element in the module persistently rendered on the touch-sensitive surface concurrent with the navigation wheel, wherein the bar UI element consumes a third affordance region that is different from both of the first affordance region and the second affordance region, and wherein a third centroid of the third affordance region intersects the transverse axis of the first affordance region, the bar UI element including a second subset of indicia in the plurality of indicia, the second subset of indicia indicative of respective labels in the plurality of labels, wherein spacing between the indicia in the second subset of indicia indicates a number of images in the plurality of images in each subset, and wherein the bar UI element includes a current location indicator that indicates a location of the first image within the ordered data structure;
  receiving a directional user input for the navigation wheel in a first lineal direction, wherein the directional user input for the navigation wheel is bound to the first lineal direction or a second lineal direction opposite of the first lineal direction, and wherein the directional user input for the navigation wheel is contact with the second affordance region by a user;
  responsive to the directional user input for the navigation wheel in the first lineal direction, replacing the first image with a second image from among the plurality of images based upon a first lineal direction in the bi-directional linear order, and updating the bar UI element to indicate a location of the second image within the ordered data structure, wherein:
    in accordance with a determination that the first image is either the first end image or the second end image and the first lineal direction is a direction away from the other of the first end image or the second end image in the bi-directional linear order, replacing the first image with the other of the first end image or the second end image, thereby providing continuous traversal through the plurality of images of the image collection; and
  receiving a second user input for the bar UI element to toggle the bar UI element between (i) a first mode wherein the respective label for each subset in the plurality of subsets is included alongside the indicia of the second subset of indicia in the plurality of indicia corresponding to the respective subset thereby including the plurality of labels in the module, and (ii) a second mode wherein the label of the current subset of the image collection is included and no other label in the plurality of labels is included, wherein the second user input for the bar UI element is contact with the third affordance region by the user.

2. The computing system of claim 1, wherein the computing system is a mobile device and wherein the accessing the image collection comprises obtaining one or more images from a remote location over a network connection.

3. The computing system of claim 1, wherein the accessing the image collection comprises obtaining one or more images from a remote location over a network connection in JSON format.

4. The computing system of claim 1, wherein the touch-sensitive display includes one or more intensity sensors that receive the directional user input and the second user input.

5. The computing system of claim 1, wherein the touch-sensitive display includes a power system for powering the touch-sensitive display, one or more processors, and the memory.

6. The computing system of claim 5, wherein the power system comprises a rechargeable battery.

7. The computing system of claim 1, further comprising a radio-frequency circuit and wherein the accessing the image collection comprises obtaining an image in the plurality of images wirelessly using the radio-frequency circuit.

8. An electronic device for providing a user interface on a touch screen for viewing images of an image collection, the electronic device comprising a touch-sensitive surface, one or more processors, and memory storing one or more programs for execution by the one or more processors, wherein:
  the image collection comprises a plurality of images indexed as an ordered list that specifies a bi-directional linear order by which images in the plurality of images are to be displayed, and wherein the ordered list (i) arranges the plurality of images into a plurality of contiguous subsets of images and (ii) further specifies a first end image and a second end image from among the plurality of images, wherein each respective contiguous subset of images in the plurality of contiguous subsets of images represents a different category in a plurality of categories, and each category in the plurality of categories is associated with a corresponding label in a plurality of labels, and wherein:
  the one or more programs comprise instructions for providing the user interface comprising:
  a first image from the image collection in a module rendered on the touch-sensitive surface based upon the bi-directional linear order, wherein a respective image rendered from the image collection consumes a first affordance region, and wherein a first centroid of the first affordance region defines a longitudinal axis and a transverse axis;
  a bar User Interface (UI) element persistently rendered on the touch-sensitive surface, wherein the bar UI element consumes a second affordance region different than the first affordance region, and wherein a second centroid of the second affordance region intersects the transverse axis of the first affordance region, the bar UI element divided into segments representing respective categories of the plurality of categories, the bar UI element including a current location indicator that indicates a current location within the ordered list;
  a navigation wheel UI element persistently rendered on the touch-sensitive surface concurrent with the bar UI element, wherein the navigation wheel consumes a third affordance region that is different from the first affordance region and the second affordance region, the navigation wheel includes a subset of indicia in a plurality of indicia indicative of a curative of the navigation wheel, and wherein a third centroid of the third affordance region intersects the longitudinal axis of the first affordance region, and wherein (i) scrolling of the navigation wheel UI element in a first lineal direction changes a currently displayed image of the image collection in accordance with a first direction in the bi-directional linear order and concurrently changes the current location indicator on the bar UI element so as to integrate movement of the navigation wheel UI element and the bar UI element and (ii) scrolling of the navigation wheel UI element in second lineal direction opposite the first lineal direction changes a currently displayed image of the image collection in accordance with a second direction in the bi-directional linear order and concurrently changes the current location indicator on the bar UI element so as to integrate movement of the navigation wheel UI element and the bar UI element; and the bar UI element is configured to switch between (i) a display mode wherein the label for each category in the plurality of categories is displayed thereby displaying the plurality of labels and wherein selection of a displayed label in the plurality of labels causes the current location indicator to jump to a position in the bi-directional linear order that represents the corresponding category of the plurality of categories and to display an image in the plurality of images that is in the corresponding category, and (ii) a standard mode wherein the label of the current category of the image collection is displayed and no other label in the plurality of labels is displayed.

9. The device of claim 8, wherein relative lengths of two segments along the bar UI element are indicative of relative number of images in the respective categories.

10. The device of claim 8, wherein the segments of the bar UI element have lengths proportional to numbers of images in respective categories of the image collection.

11. The device of claim 8, wherein the navigation wheel is rendered in an edge-on view.

12. The device of claim 8, wherein the current location is indicated by a respective indicia of a second subset of indicia in the plurality of indicia, the respective indicia along a length of the bar UI element.

13. The device of claim 12, wherein changing a direction of scrolling of the navigation wheel changes a direction of motion of the respective indicia along the length of the bar UI element.

14. The device of claim 12, wherein the bar UI element is rendered in different styles on opposite sides of the respective indicia.

15. The device of claim 8, wherein scrolling past an end of the current category and into an adjacent category causes a label of the adjacent category to be displayed on or alongside the bar UI element.

16. The device of claim 8, wherein:
the bar UI element provides location information in a position-indicating mode, and selection of the bar UI element causes transformation of the bar UI element into a navigation mode.

17. The device of claim 8, further comprising:
a coaching screen prompting at least one user input, wherein the coaching screen is displayed prior to changing the currently displayed image of the image collection in accordance with the bi-directional linear order and concurrently changing the current location indicator on the bar UI element responsive to scrolling of the navigational wheel.

18. A method performed at an electronic device with a touch-sensitive surface executing one or more applications, the method comprising:
persistently rendering a navigation wheel within a first application in the one or more applications, wherein the first application electronically accesses an image collection comprising a plurality of images indexed as an ordered list that specifies a bi-directional linear order by which images in the plurality of images are to be displayed, and wherein the ordered list (i) arranges the plurality of images into a plurality of contiguous subsets of images and (ii) further specifies a first end image and a second end image from among the plurality of images, wherein each respective contiguous subset of images in the plurality of contiguous subsets of images represents a different category in a plurality of categories, and each category in the plurality of categories is associated with a corresponding label in a plurality of labels, and wherein the first application displays a currently displayed image from the image collection on the touch-sensitive surface in accordance with the bi-directional linear order, wherein the current displayed image from the image collection consumes a first affordance region, wherein a first centroid of the first affordance region defines a longitudinal axis and a transverse axis, and wherein the navigation wheel consumes a second affordance region that is different from the first affordance region, the navigation wheel includes a first subset of indicia in a plurality of indicia, the first subset of indicia indicative of a curative of the navigation wheel, and wherein a second centroid of the second affordance region intersects the longitudinal axis of the first affordance region;

persistently rendering a bar UI element concurrently with the navigation wheel within the first application, wherein the bar UI element consumes a third affordance region that is different from both of the first affordance region and the second affordance region, and wherein a third centroid of the third affordance region intersects the transverse axis of the first affordance region, the bar UI element including a second subset of indicia in the plurality of indicia, the second subset of indicia indicative of respective categories in the plurality of categories, wherein spacing between the indicia in the second subset of indicia indicates a number of images in the plurality of images in each category, and wherein the bar UI element displays a current location indicator that indicates a location of the currently displayed image within the ordered list;

receiving a directional user input for the navigation wheel in a first lineal direction wherein the directional user input for the navigation wheel is bound to the first lineal direction or a second lineal direction opposite of the first lineal direction, and wherein the directional user input for the navigation wheel is contact with the second affordance region by a user;

responsive to the directional user input for the navigation wheel in the first lineal direction, replacing the currently displayed image with a replacement image from among the plurality of images in accordance with a first lineal direction in the bi-directional linear order, and updating the bar UI element to indicate a location of the replacement image, wherein:

in accordance with a determination that the first image is either the first end image or the second end image and the first lineal direction is a direction away from the other of the first end image or the second end image in the bi-directional linear order, replacing the first image with the other of the first end image or the second end image, thereby providing continuous traversal through the plurality of images of the image collection; and receiving a second user input for the bar UI element to toggle the bar UI element between (i) a navigation mode wherein the respective label for each category in the plurality of categories is displayed alongside the indicia of the second subset of indicia in the plurality of indicia corresponding to the respective category thereby displaying the plurality of labels, and (ii) a standard mode wherein the label of the current category of the image collection is displayed and no other label in the plurality of labels is displayed, wherein the second user input for the bar UI element is contact with the third affordance region by the user.

19. The method of claim 18, further comprising:
receiving a selection of a displayed label in the plurality of labels while the bar UI element is in the navigation mode; and
responsive to the selection:
(i) causing the current location indicator to jump to a first category of the plurality of categories that corresponds to the selected label;
(ii) displaying a first image in the plurality of images that is in the first category;
(iii) toggling the bar UI element to standard mode; and
(iv) indicating, on the bar UI element, a location of the first image within the ordered list.

20. The method of claim 19, further comprising providing haptic feedback in response to at least one of: receiving the second user input or receiving the selection of a label.

21. The method of claim 18, wherein a distance between the currently displayed image and the replacement image is dependent on a magnitude of the directional user input.

22. The method of claim 18, wherein the displayed labels are evenly spaced in the navigation mode.

23. The method of claim 18, wherein the second user input is caused by a user sliding one or more of the plurality of indicia along the bar UI element.

24. The method of claim 18, further comprising displaying, after a predetermined number of images in the plurality of images have been displayed, a coaching screen configured to teach a user interface input function.

25. The method of claim 18, the method further comprising:
receiving a directional user input for the navigation wheel in a second lineal direction opposite the first lineal direction; and
responsive to the directional user input in the second lineal direction, replacing the currently displayed image with a replacement image from among the plurality of images in accordance with a second lineal direction in the bi-directional linear order opposite the first lineal direction in the bi-directional linear order, and updating the bar UI element to indicate a location of the replacement image.

26. A method comprising:
rendering persistently and concurrently, on a display, a wheel User Interface (UI) element and a bar UI element;
successively rendering, on the display, respective pictures of a plurality of pictures, wherein the plurality of pictures are indexed as an ordered list that specifies a bi-directional linear order by which pictures in the plurality of pictures are to be displayed, and wherein the ordered list comprises a plurality of contiguous subsets of pictures, wherein each respective contiguous subset of pictures in the plurality of contiguous subsets of pictures represents a different category in a plurality of categories, and each category in the plurality of categories is associated with a corresponding label in a plurality of labels, wherein:
the current displayed image from the image collection consumes a first affordance region, wherein a first centroid of the first affordance region defines a longitudinal axis and a transverse axis, the wheel UI element consumes a second affordance region that is different from the first affordance region, and wherein a second centroid of the second affordance region intersects the longitudinal axis of the first affordance region, and the bar UI element consumes a third affordance region that is different from both of the first affordance region and the second affordance region, and wherein a third centroid of the third affordance region intersects the transverse axis of the first affordance region;
navigating through the plurality of pictures, responsive to user inputs for the wheel UI element, in accordance with the bi-directional linear order;
rendering, on the wheel UI element, a first subset of indicia in a plurality of indicia, the first subset of indicia indicative of a curative of the wheel UI element;
rendering, on the bar UI element, a second subset of indicia in the plurality of indicia, the second subset of indicia demarcating categories of the plurality of pictures;
indicating, on the bar UI element, representative positions of the rendered pictures within the ordered list;
wherein the bar UI element has a position indicating mode in which spacing between the indicia in the second subset of indicia is dependent on a number of pictures of the corresponding category;
receiving a user input for the bar UI element in position indicating mode;
responsive to the user input for the bar UI, transforming the bar UI element into a navigation mode wherein the plurality of selectable labels is displayed, each selectable label in the plurality of selectable labels in association with a corresponding indicium in the second subset of indicia in the plurality of indicia;
receiving a selection of a label; and
responsive to the selection of the label, transforming the bar UI element into position indicating mode, and rendering a picture from the category associated with the selected label.

27. A non-transitory computer readable storage medium stored on a computing device, the computing device comprising a touch-sensitive surface, one or more processors and memory storing one or more programs for execution by the one or more processors, wherein the one or more programs singularly or collectively comprise instructions for running an application on the computing device that executes a method comprising:
accessing an image collection comprising a plurality of images indexed as an ordered data structure that specifies a bi-directional linear order by which images in the plurality of images are to be accessed, wherein the ordered data structure comprises (i) arranges the plurality of images into a plurality of contiguous subsets of images and (ii) further specifies a first end image and a second end image from among the plurality of images, and wherein:
each respective contiguous subset of images in the plurality of contiguous subsets of images represents a different label in a plurality of labels;
including a first image from the image collection in a module rendered on the touch-sensitive surface based upon the bi-directional linear order, wherein a respective image rendered from the image collection consumes a first affordance region, and wherein a first centroid of the first affordance region defines a longitudinal axis and a transverse axis;
including a navigation wheel in the module persistently rendered on the touch-sensitive surface, wherein the navigation wheel consumes a second affordance region that is different from the first affordance region, the navigation wheel includes a first subset of indicia in a plurality of indicia, the first subset of indicia indicative of a curative of the navigation wheel, and wherein a second centroid of the second affordance region intersects the longitudinal axis of the first affordance region;

including a bar UI element in the module persistently rendered on the touch-sensitive surface concurrent with the navigation wheel, wherein the bar UI element consumes a third affordance region that is different from both of the first affordance region and the second affordance region, and wherein a third centroid of the third affordance region intersects the transverse axis of the first affordance region, the bar UI element including a second subset of indicia in the plurality of indicia, the second subset of indicia indicative of respective labels in the plurality of labels, wherein spacing between the indicia in the second subset of indicia indicates a number of images in the plurality of images in each subset, and wherein the bar UI element includes a current location indicator that indicates a location of the first image within the ordered data structure;

receiving a directional user input for the navigation wheel in a first lineal direction, wherein the directional user input for the navigation wheel is bound to the first lineal direction or a second lineal direction opposite of the first lineal direction, and wherein the directional user input for the navigation wheel is contact with the second affordance region by a user;

responsive to the directional user input for the navigation wheel in the first lineal direction, replacing the first image with a second image from among the plurality of images based upon a first lineal direction in the bi-directional linear order, and updating the bar UI element to indicate a location of the second image within the ordered data structure, wherein:

in accordance with a determination that the first image is either the first end image or the second end image and the first lineal direction is a direction away from the other of the first end image or the second end image in the bi-directional linear order, replacing the first image with the other of the first end image or the second end image, thereby providing continuous traversal through the plurality of images of the image collection; and receiving a second user input for the bar UI element to toggle the bar UI element between (i) a first mode wherein the respective label for each subset in the plurality of subsets is included alongside the indicia of the second subset of indicia in the plurality of indicia corresponding to the respective subset thereby including the plurality of labels in the module, and (ii) a second mode wherein the label of the current subset of the image collection is included and no other label in the plurality of labels is included, wherein the second user input for the bar UI element is contact with the third affordance region by the user.

* * * * *